US012504295B2

(12) United States Patent
Ormond et al.

(10) Patent No.: US 12,504,295 B2
(45) Date of Patent: Dec. 23, 2025

(54) LABEL LOCATION ADJUSTMENT FOR MULTI-LAYER MAP

(71) Applicant: THE BOEING COMPANY, Chicago, IL (US)

(72) Inventors: Shawn Eric Ormond, Commerce City, CO (US); Graham Emde, Centennial, CO (US); Christopher Collyard, Littleton, CO (US)

(73) Assignee: THE BOEING COMPANY, Arlington, VA (US)

( * ) Notice: Subject to any disclaimer, the term of this patent is extended or adjusted under 35 U.S.C. 154(b) by 261 days.

(21) Appl. No.: 18/068,673

(22) Filed: Dec. 20, 2022

(65) Prior Publication Data
US 2024/0200966 A1 Jun. 20, 2024

(51) Int. Cl.
*G06K 7/10* (2006.01)
*G01C 21/00* (2006.01)
*G01C 21/32* (2006.01)
*G01C 21/36* (2006.01)
*G06T 11/00* (2006.01)

(52) U.S. Cl.
CPC ......... *G01C 21/3673* (2013.01); *G01C 21/32* (2013.01); *G01C 21/3807* (2020.08); *G01C 21/3878* (2020.08); *G06T 11/00* (2013.01)

(58) Field of Classification Search
CPC .................................................. G01C 21/3673
See application file for complete search history.

(56) References Cited

U.S. PATENT DOCUMENTS

| 5,684,940 A | 11/1997 | Freeman et al. |
| 9,396,697 B2 | 7/2016 | Adlers et al. |
| 10,489,954 B1 | 11/2019 | Loer et al. |
| 10,769,346 B1 | 9/2020 | Yu et al. |
| 10,809,090 B2 | 10/2020 | Cai et al. |
| 2005/0137791 A1 | 6/2005 | Agrawala et al. |
| 2006/0279432 A1 | 12/2006 | Mori |
| 2010/0246996 A1 | 9/2010 | Yamamoto |
| 2012/0120104 A1 | 5/2012 | Kuhne |

(Continued)

FOREIGN PATENT DOCUMENTS

| EP | 1502080 A1 | 2/2005 |
| WO | 03093768 A1 | 11/2003 |

OTHER PUBLICATIONS

QGIS User Guide, Release 3.4, 2020, pp. 1-625 (Year: 2020).*

(Continued)

*Primary Examiner* — Samantha (Yuehan) Wang
(74) *Attorney, Agent, or Firm* — Moore IP Law

(57) ABSTRACT

A device includes one or more processors configured to perform one or more first deconfliction operations, for a first map layer, to determine first candidate label locations of first labels that identify first map locations. The one or more processors are also configured to perform one or more second deconfliction operations, for a second map layer, to determine first candidate label locations of second labels that identify second map locations. The one or more processors are further configured to perform one or more third deconfliction operations, for the first map layer and the second map layer, to determine an updated candidate label location of at least one of the first labels, an updated candidate label location of at least one of the second labels, or both.

20 Claims, 17 Drawing Sheets

(56) References Cited

U.S. PATENT DOCUMENTS

| | | | |
|---|---|---|---|
| 2012/0154430 A1 | 6/2012 | Matsushima et al. | |
| 2018/0052594 A1 | 2/2018 | Bemel-Benrud et al. | |
| 2018/0260986 A1 | 9/2018 | Girsova et al. | |
| 2019/0362526 A1 | 11/2019 | Loer et al. | |
| 2021/0142527 A1* | 5/2021 | Gyurdiev | G09B 29/003 |
| 2022/0082404 A1* | 3/2022 | Barre | G01C 21/3863 |
| 2022/0207800 A1 | 6/2022 | Pozdnyakov | |
| 2023/0083428 A1 | 3/2023 | Natori | |
| 2024/0185556 A1 | 6/2024 | Kruelle | |

OTHER PUBLICATIONS

Pavlovec et al., Rapid Labels: Point-Feature Labeling on GPU, IEEE Transactions on Visualization and Computer Graphics, vol. 28, No. 1, Jan. 2022, pp. 604-613 (Year: 2022).*
Extended European Search Report dated Apr. 26, 2024, pp. 1-12.
Qgis Project: "QGIS User Guide—Release 3.4", Part I, Mar. 15, 2020, pp. 1-631, retrieved from internet Mar. 4, 2024.
Communication pursuant to Article 94(3) EPC for application No. 23204335.6 dated Sep. 24, 2025, pp. 1-5.

* cited by examiner

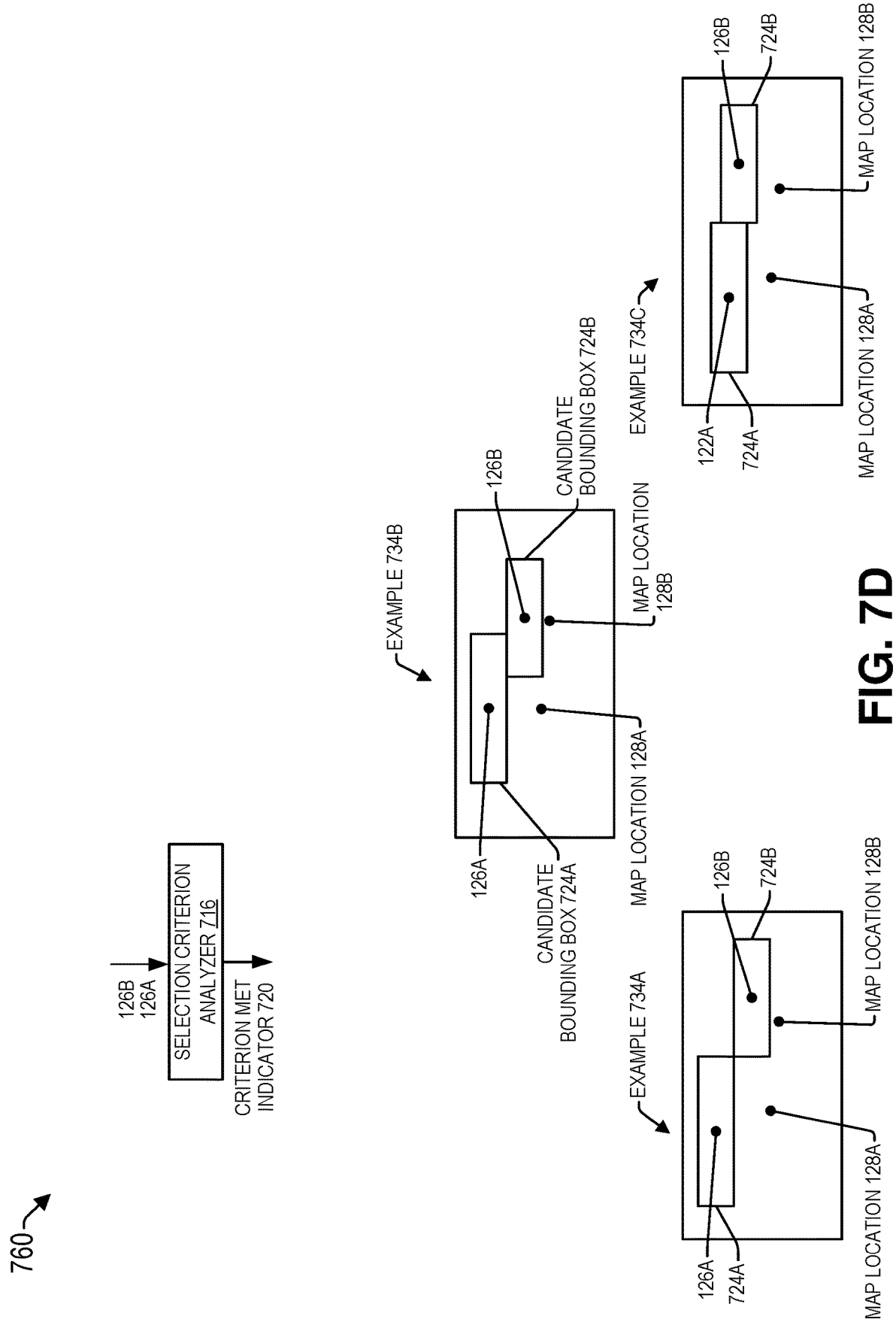

LABEL LOCATION ADJUSTMENT FOR MULTI-LAYER MAP

FIELD OF THE DISCLOSURE

The present disclosure is generally related to adjusting locations of labels of a map with multiple layers.

BACKGROUND

Maps typically have labels to identify locations. In some cases, a map is automatically rendered with labels that are at pre-determined positions relative to corresponding map locations. For example, a first label identifying a first map location is at a first label location, and a second label identifying a second map location is at a second label location. In some examples, the first label and the second label can correspond to different layers of a map. If the first label is overlaid on the second label, the second label is difficult to read. Maps that are easier to read aid in making more reliable navigation decisions.

SUMMARY

In a particular implementation, a device includes: one or more processors configured to: perform one or more first deconfliction operations, for a first map layer, to determine first candidate label locations of first labels that identify first map locations; perform one or more second deconfliction operations, for a second map layer, to determine first candidate label locations of second labels that identify second map locations; and perform one or more third deconfliction operations, for the first map layer and the second map layer, to determine an updated candidate label location of at least one of the first labels, an updated candidate label location of at least one of the second labels, or both.

In another particular implementation, a method includes: performing one or more first deconfliction operations, for a first map layer, to determine first candidate label locations of first labels that identify first map locations; performing one or more second deconfliction operations, for a second map layer, to determine second candidate label locations of second labels that identify second map locations; and performing one or more third deconfliction operations, for the first map layer and the second map layer, to determine an updated first candidate label location of at least one of the first labels, an updated second candidate label location of at least one of the second labels, or both.

In another particular implementation, a non-transitory computer-readable medium stores instructions that, when executed by one or more processors, cause the one or more processors to: perform one or more first deconfliction operations, for a first map layer, to determine first candidate label locations of first labels that identify first map locations; perform one or more second deconfliction operations, for a second map layer, to determine first candidate label locations of second labels that identify second map locations; and perform one or more third deconfliction operations, for the first map layer and the second map layer, to determine an updated candidate label location of at least one of the first labels, an updated candidate label location of at least one of the second labels, or both.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 7D is a diagram that illustrates examples of operations performed by a selection criterion analyzer of the intra-layer conflict analyzer of FIG. 7A.

DETAILED DESCRIPTION

Figure 1:
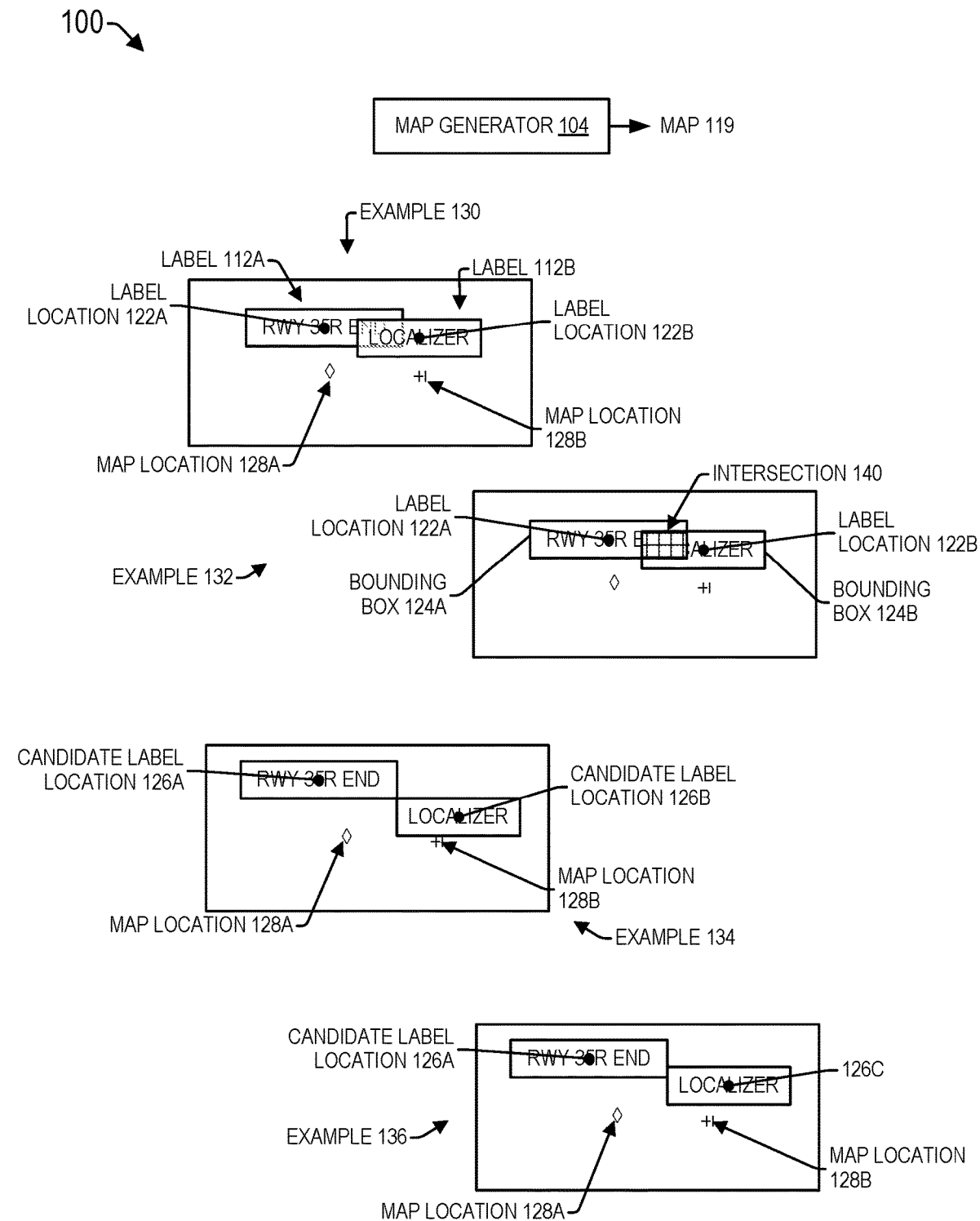
FIG. 1 is a diagram that illustrates examples of operations performed by a map generator that is configured to adjust locations of labels of a map with multiple layers.

Aspects disclosed herein present systems and methods for adjusting locations of map labels. In some cases, a map is automatically rendered with labels that are at pre-determined positions relative to corresponding map locations. For example, a first label identifying a first map location is at a first label location. The first label location corresponds to a particular position (e.g., a pre-determined distance, a pre-determined direction, or both) relative to the first map location. Similarly, a second label identifying a second map location is at a second label location. If the first label is overlaid on the second label, the second label is difficult to read.

In some examples, the first label corresponds to a first map layer, and the second label corresponds to a second map layer. For example, the first map layer indicates labels of a first type (e.g., navigation aids (navaids)) and the second map layer indicates labels of a second type (e.g., airspaces). If the map is displayed including the first map layer and the second map layer and the first label is overlaid on the second label, the second label is difficult to read.

A map generator, prior to generating the map, determines whether any conflicts are detected corresponding to overlapping intra-layer labels (e.g., between labels corresponding to the same layer) or overlapping inter-layer labels (e.g., between labels corresponding to different layers). The map generator, in response to detecting a conflict between any pair of labels, performs deconfliction by determining an adjusted label location for at least one of the pair of labels. The map thus having fewer conflicting labels (e.g., none) is easier to read and aids in more reliable navigation. Resolving the conflicts prior to generating (e.g., rendering) the map is faster and uses fewer computing resources than moving labels in a rendered map. In some cases, the conflicts can be resolved prior to a time-critical rendering and use of the map.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple labels are illustrated and associated with reference numbers 112A and 112B. When referring to a particular one of these labels, such as the label 112A, the distinguishing letter "A" is used. However, when referring to any arbitrary one of these labels or to these labels as a group, the reference number 112 is used without a distinguishing letter.

Figure 2:
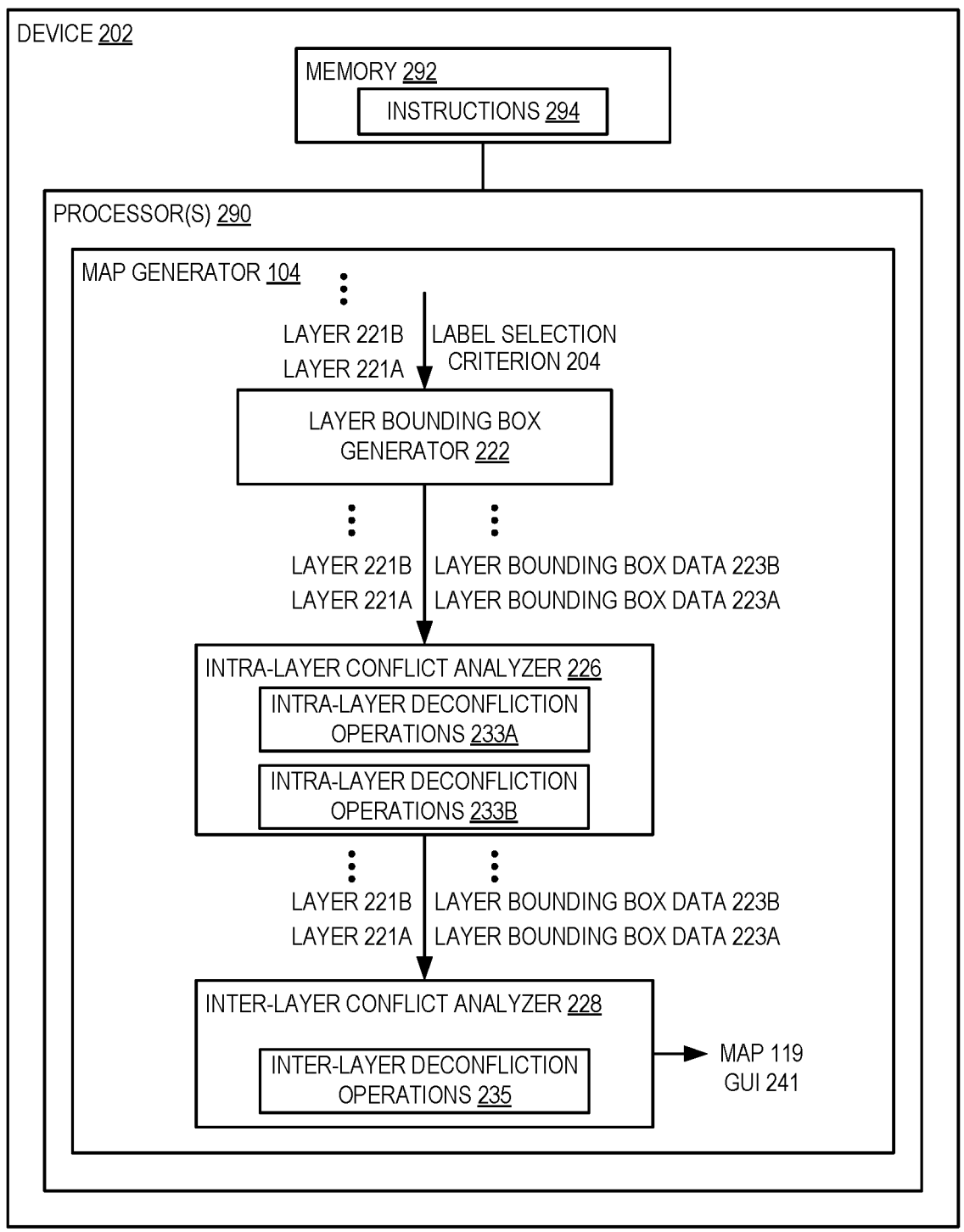
FIG. 2 is a diagram of a system that includes the map generator of FIG. 1.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 2 depicts a device 202 including one or more processors ("processor(s)" 290 in FIG. 2), which indicates that in some implementations the device 202 includes a single processor 290 and in other implementations the device 202 includes multiple processors 290. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first." "second." "third." etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating." "calculating." "using." "selecting," "accessing," and "determining" are interchangeable unless context indicates otherwise. For example, "generating." "calculating." or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts a diagram 100 of an example 130, an example 132, an example 134, and an example 136 of operations performed by a map generator 104 that is configured to adjust locations of labels of maps with multiple layers.

The map generator 104 determines that a plurality of labels 112, such as a label 112A and a label 112B, are to be displayed in a map, as further described with reference to FIGS. 2-4. Each of the plurality of labels 112 identifies a corresponding map location 128. For example, a label 112 includes text, a symbol, a graphic, etc. identifying a map location 128. The map generator 104 determines, based on offset data, label locations 122 of the plurality of labels 112, as further described with reference to FIGS. 2, 3, and 5. In the example 130, the label 112A identifying a map location 128A has a label location 122A, and the label 112B identifying a map location 128B has a label location 122B. In a particular aspect, the map location 128A is indicated using a first map location symbol (e.g., 0), and the map location 128B is indicated using a second map location symbol (e.g., +1).

In some examples, the label 112A is associated with the same map layer as the label 112B. For example, the map layer includes labels of a first label type of the label 112A and a second label type of the label 112B. In other examples, the label 112A is associated with a first map layer, and the label 112B is associated with a second map layer that is distinct from the first map layer. To illustrate, the first map layer includes labels of a first label type of the label 112A, and the second map layer includes labels of a second label type of the label 112B.

The map generator 104 obtains label display data indicating how various types of labels 112 are to be displayed. For example, the label display data can indicate a font size, a font type, a buffer around the text, etc. The map generator 104, based on the label display data, a zoom level, label locations 122, or a combination thereof, determines bounding boxes 124 of the plurality of labels 112, as further described with reference to FIGS. 2, 3, and 6. The map generator 104 determines whether any of the bounding boxes 124 overlap. In the example 132, the map generator 104 determines a bounding box 124A of the label 112A and determines a bounding box 124B of the label 112B. The map generator 104, based on detecting an intersection 140 of the bounding box 124A and the bounding box 124B, determines that the bounding box 124A overlaps the bounding box 124B, as further described with reference to FIGS. 2, 3, 7A, 7B, 8A, and 8B.

The map generator 104, in response to determining that a pair of bounding boxes 124 overlap, determines a candidate label location for at least one of the pair of bounding boxes 124 based on the intersection 140, as further described with reference to FIGS. 2, 3, 7A, 7C, 8A, and 8C. In the example 134, the map generator 104, in response to determining that the bounding box 124A overlaps the bounding box 124B, determines a candidate label location 126A of the label 112A and a candidate label location 126B of the label 112B. The candidate label location 126A and the candidate label location 126B are based on the intersection 140. In some implementations, the map generator 104 determines whether label locations satisfy a selection criterion, as further described with reference to FIGS. 2, 3, 7A, 7D, 8A, and 8D. In the example 134, the map generator 104 determines that the candidate label location 126A satisfies a first selection criterion, and that the candidate label location 126B fails to satisfy a second selection criterion.

In some examples, the selection criterion indicates that a label location (e.g., a label location 122 or a candidate label location 126) of a label 112 is to be within a threshold distance of a map location 128 identified by the label 112. In some examples, the selection criterion indicates that the label location is to be selected such that a corresponding bounding box does not overlap a map location symbol of the map location 128. In the example 134, the map generator 104, in response to determining that a bounding box of the label 112B at the candidate label location 126B overlaps a map location symbol of the map location 128B, determines that the candidate label location 126B fails to satisfy a selection criterion.

In the example 136, the map generator 104, in response to determining that the candidate label location 126B fails to satisfy the selection criterion, determines a candidate label location 126C of the label 112B that satisfies the selection criterion such that a bounding box of the label 112B at the candidate label location 126C does not overlap with a bounding box of the label 112A at the candidate label location 126A, as further described with reference to FIGS. 2.3, 7A, 7D, 8A, and 8D.

In some implementations, the map generator 104 generates (e.g., renders) a map 119 with the label 112A at the candidate label location 126A and the label 112B at the candidate label location 126C. In some implementations, the map generator 104 generates map data indicating that the label 112A and the label 112B are to be rendered at the candidate label location 126A and the candidate label location 126C, respectively. In these implementations, another component or device may generate the map 119 based on the map data.

A technical advantage of the map 119 including the label 112A at the candidate label location 126A and the label 112B at the candidate label location 126C can include the map 119 being easier to read than a map that includes the label 112A at the label location 122A and the label 112B at the label location 122B. A technical advantage of resolving the conflicts prior to generating (e.g., rendering) the map 119 can include using less time and fewer computing resources as compared to moving labels in a rendered map. In some cases, a map is rendered in real-time as the map is being used. If a map is used for navigation of a vehicle in a rapidly changing landscape, adjusting labels after the map is rendered can take so long that the information on the map becomes obsolete for navigation as the vehicle has moved on to a different location. With conflicts resolved prior to rendering, the map 119 can be rendered with resolved conflicts faster and aid navigation in time-critical situations.

FIG. 2 depicts an example of a system 200 that includes the map generator 104. In a particular aspect, the system 200 includes a device 202 that includes one or more processors 290 coupled to a memory 292.

The memory 292 includes a computer-readable medium that stores instructions 294 that are executable by the one or more processors 290. The instructions 294 are executable to initiate, perform or control operations to aid in adjusting locations of labels of a map. The one or more processors 290 include the map generator 104 that can be implemented at least in part by the one or more processors 290 executing the instructions 294.

The one or more processors 290 can be implemented as a single processor or as multiple processors, such as in a multi-core configuration, a multi-processor configuration, a distributed computing configuration, a cloud computing configuration, or any combination thereof. In some implementations, one or more portions of the map generator 104 are implemented by the one or more processors 290 using dedicated hardware, firmware, or a combination thereof.

The map generator 104 includes a layer bounding box generator 222 coupled via an intra-layer conflict analyzer 226 to an inter-layer conflict analyzer 228. The layer bounding box generator 222 is configured to generate layer bounding box data 223 of a layer 221, as further described with reference to FIGS. 3-6, 9A, and 9B. The layer bounding box data 223 indicates dimensions and locations of bounding boxes included in the layer 221.

The intra-layer conflict analyzer 226 is configured to perform intra-layer deconfliction operations 233 to update the layer bounding box data 223 of the layer 221 responsive to detecting any conflicts among the labels of the layer 221, as further described with reference to FIGS. 7A-7D and 10. The inter-layer conflict analyzer 228 is configured to perform inter-layer deconfliction operations 235 to update the layer bounding box data 223 of multiple layers 221 responsive to detecting any conflicts among the labels of distinct layers 221, as further described with reference to FIGS. 8A-8D and 11. The inter-layer conflict analyzer 228 is configured to generate a map 119 based on the layer bounding box data 223.

During operation, the device 202 activates the map generator 104 to generate a map 119 including layers 221. In a particular aspect, the map generator 104 is activated responsive to the device 202 receiving a user input, a command from another device, or both. In a particular aspect, the layers 221 to be included in the map 119 are based on a user input, a command from another device, a configuration setting, default data, or a combination thereof.

The layer bounding box generator 222 generates layer bounding box data 223 for each of the layers 221, as further described with reference to FIGS. 3-6, 9A, and 9B. For example, the layer bounding box generator 222 generates layer bounding box data 223A of a layer 221A. As another example, the layer bounding box generator 222 generates layer bounding box data 223B of a layer 221B. The layer bounding box generator 222 generating the layer bounding box data 223 for two layers is provided as an illustrative example. In other examples, the layer bounding box generator 222 can generate the layer bounding box data 223 for more than two layers.

In some implementations, the layer bounding box generator 222 generates the layer bounding box data 223 of the layer 221 based on a label selection criterion 204, as further described with reference to FIGS. 4 and 9A. In a particular aspect, the label selection criterion 204 is based on a user input, a configuration setting, a command from another device, default data, or a combination thereof.

The intra-layer conflict analyzer 226 performs intra-layer deconfliction operations 233 to update the layer bounding box data 223 of each of the layers 221 responsive to detecting any conflicts among the labels of the layer 221, as further described with reference to FIGS. 7A-7D and 10. For example, the intra-layer conflict analyzer 226, based on determining that a first bounding box 124 of a label 112A of a layer 221 overlaps a second bounding box 124 of a label 112B of the layer 221, detects a conflict between the label 112A and the label 112B. The intra-layer conflict analyzer 226, based on an intersection between the first bounding box 124 and the second bounding box 124, determines a candidate label location of the label 112A, a candidate label location of the label 112B, or both. The layer bounding box data 223 designates, for each of the labels 112 of the layer 221, a corresponding label location determined by the layer bounding box generator 222 or a corresponding candidate label location determined by the intra-layer conflict analyzer 226 to resolve an intra-layer conflict.

In an example, the intra-layer conflict analyzer 226 performs intra-layer deconfliction operations 233A to update the layer bounding box data 223A responsive to detecting any conflicts among the labels of the layer 221A. As another example, the intra-layer conflict analyzer 226 performs intra-layer deconfliction operations 233B to update the layer bounding box data 223B responsive to detecting any conflicts among the labels of the layer 221B. In some examples, the intra-layer conflict analyzer 226 performs intra-layer deconfliction operations 233 to update layer bounding box data 223 of one or more additional layers of the layers 221.

The inter-layer conflict analyzer 228 performs inter-layer deconfliction operations 235 to update the layer bounding box data 223 of multiple layers 221 responsive to detecting any conflicts among the labels of distinct layers 221, as further described with reference to FIGS. 8A-8D and 11. For example, the inter-layer conflict analyzer 228, based on determining that a first bounding box 124 of a label 112A of a layer 221A overlaps a second bounding box 124 of a label 112B of a layer 221B, detects a conflict between the label 112A and the label 112B. The inter-layer conflict analyzer 228, based on an intersection between the first bounding box 124 and the second bounding box 124, determines a candidate label location of the label 112A, a candidate label location of the label 112B, or both. The layer bounding box data 223A designates, for each of the labels 112 of the layer 221A, a corresponding label location determined by the layer bounding box generator 222, a corresponding candidate label location determined by the intra-layer conflict analyzer 226 to resolve an intra-layer conflict, or a corresponding candidate label location determined by the inter-layer conflict analyzer 228 to resolve an inter-layer conflict.

In an example, the inter-layer conflict analyzer 228 performs inter-layer deconfliction operations 235 to update the layer bounding box data 223A, the layer bounding box data 223B, or both, responsive to detecting any conflicts among at least one label of the layer 221A and at least one label of the layer 221B. The inter-layer conflict analyzer 228 performing the inter-layer deconfliction operations 235 for two layers is provided as an illustrative example. In other examples, the inter-layer conflict analyzer 228 can perform the inter-layer deconfliction operations 235 for more than two layers. For example, the inter-layer conflict analyzer 228 can perform the inter-layer deconfliction operations 235 for at least one of the layer 221A and the layer 221B, the layer 221A and a third layer, the layer 221B and the third layer, or additional combinations of layers.

The inter-layer conflict analyzer 228 generates a map 119 based on the layer bounding box data 223 of the layers 221. In some implementations, the map generator 104, based on determining that a conflict between a label 112A and a label 112B is not resolvable within a threshold count of deconfliction attempts, that a designated label location of at least one of the label 112A or the label 112B fails to satisfy a selection criterion, or both, generates a notification indicating the conflict, the failure to satisfy the selection criterion, or both.

In a particular aspect, the inter-layer conflict analyzer 228 generates a graphical user interface (GUI) 241 indicating the notification, generates (e.g., renders) the map 119 including the notification, sends the notification to another device, or a combination thereof. In a particular aspect, the inter-layer conflict analyzer 228 provides the GUI 241, the map 119, the notification, of a combination thereof, to a device, such as a monitor, a touch screen, a user device, a network device, a communication device, or a combination thereof.

In some aspects, the map generator 104, in response to receiving a user input indicating a particular label location of a label 112, updates a designated label location of the label 112 in the corresponding layer bounding box data 223 to indicate the particular label location. For example, a user can override a label location automatically designated by the map generator 104. In a particular aspect, the map generator 104 generates (e.g., renders) the map 119 including labels 112 at the designated label locations. In a particular implementation, the map generator 104 generates map data indicating that the labels 112 are to be displayed (e.g., rendered) at the designated label locations, and another device (or component) generates the map 119 based on the map data.

A technical advantage of the system 200 resolving the conflicts prior to generating (e.g., rendering) the map 119 can include using less time and fewer computing resources as compared to moving labels in a rendered map. In some cases, a map is rendered in real-time as the map is being used. If a map is used for navigation of a vehicle in a rapidly changing landscape, adjusting labels after the map is rendered can take so long that the information on the map becomes obsolete for navigation as the vehicle has moved on to a different location. With conflicts resolved prior to rendering, the map 119 can be rendered with resolved conflicts faster and aid navigation in time-critical situations.

Although the layer bounding box generator 222, the intra-layer conflict analyzer 226, and the inter-layer conflict analyzer 228 are depicted as separate components, in other implementations the described functionality of two or more of the layer bounding box generator 222, the intra-layer conflict analyzer 226, and the inter-layer conflict analyzer 228 can be performed by a single component. In some implementations, each of the layer bounding box generator 222, the intra-layer conflict analyzer 226, the inter-layer conflict analyzer 228, and the map generator 104 can be represented in hardware, such as via an application-specific integrated circuit (ASIC) or a field-programmable gate array (FPGA), or the operations described with reference to the elements may be performed by a processor executing computer-readable instructions.

Figure 3:
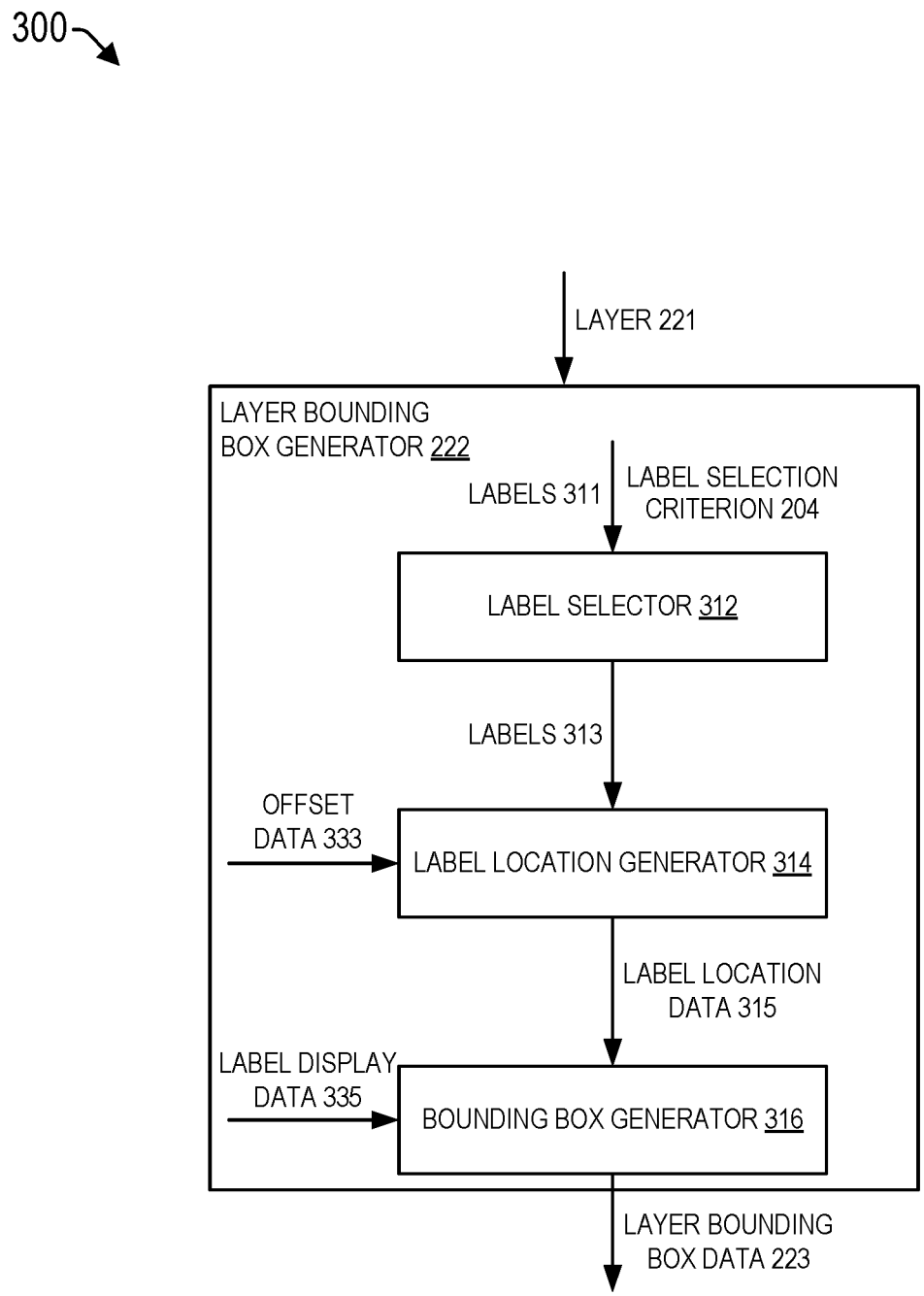
FIG. 3 is a diagram that illustrates examples of operations performed by a layer bounding box generator of the map generator of FIG. 1.

Referring to FIG. 3, a diagram 300 is shown of examples of operations performed by the layer bounding box generator 222. The layer bounding box generator 222 includes a label selector 312 coupled, via a label location generator 314, to a bounding box generator 316.

The label selector 312 is configured to select labels 313 from labels 311 of a layer 221 based on a label selection criterion 204, as further described with reference to FIG. 4. The label location generator 314 is configured to determine label location data 315 of the labels 313 based on offset data 333, as further described with reference to FIG. 5. The label location data 315 indicates label locations 122 of the labels 313.

The bounding box generator 316 is configured to generate layer bounding box data 223 of the labels 313 based on label display data 335, a zoom level, the label location data 315, or a combination thereof, as further described with reference to FIG. 6. The layer bounding box data 223 indicates dimensions and locations of bounding boxes 124 of the labels 313.

During operation, the map generator 104 uses the layer bounding box generator 222 to generate the layer bounding box data 223 for each of the layers 221 of the map 119. The label selector 312 obtains labels 311 associated with the layer 221 and selects labels 313 from the labels 311 that satisfy a label selection criterion 204, as further described with reference to FIG. 4. The labels 313 are to be included in the map 119 for the layer 221. In some examples, the label selection criterion 204 is indicated by a user input, a command, a configuration setting, default data, or a combination thereof.

The label location generator 314 generates label location data 315 of the labels 313 based on offset data 333, as further described with reference to FIG. 5. In an example, the offset data 333 indicates where labels 313 of a particular label type are to be displayed relative to corresponding map locations 128. In some implementations, different label types (e.g., labels associated with different types of information) are associated with different offset data 333. In a particular aspect, the offset data 333 is based on a user input, a configuration setting, default data, or a combination thereof.

The bounding box generator 316 generates layer bounding box data 223 of the labels 313 based on label display data 335, the label location data 315, a zoom level, or a combination thereof, as further described with reference to FIG. 6. In an example, the label display data 335 indicates that labels of a particular label type are to be displayed with a font type, a font size, etc. The bounding box generator 316 determines the layer bounding box data 223 indicating dimensions (e.g., width and height) of a bounding box 124 of a label 112 of the labels 313 of the layer 221 based at least in part on the label display data 335 associated with a label type of the label 112. In some aspects, the layer bounding box data 223 indicates bounding boxes (e.g., default bounding boxes) of the labels 313 of the layer 221 prior to performance of any deconfliction operations.

Although the label selector 312, the label location generator 314, and the bounding box generator 316 are depicted as separate components, in other implementations the described functionality of two or more of the label selector 312, the label location generator 314, and the bounding box generator 316 can be performed by a single component. In some implementations, each of the label selector 312, the label location generator 314, and the bounding box generator 316 can be represented in hardware, such as via an application-specific integrated circuit (ASIC) or a field-programmable gate array (FPGA), or the operations described with reference to the elements may be performed by a processor executing computer-readable instructions.

Figure 4:
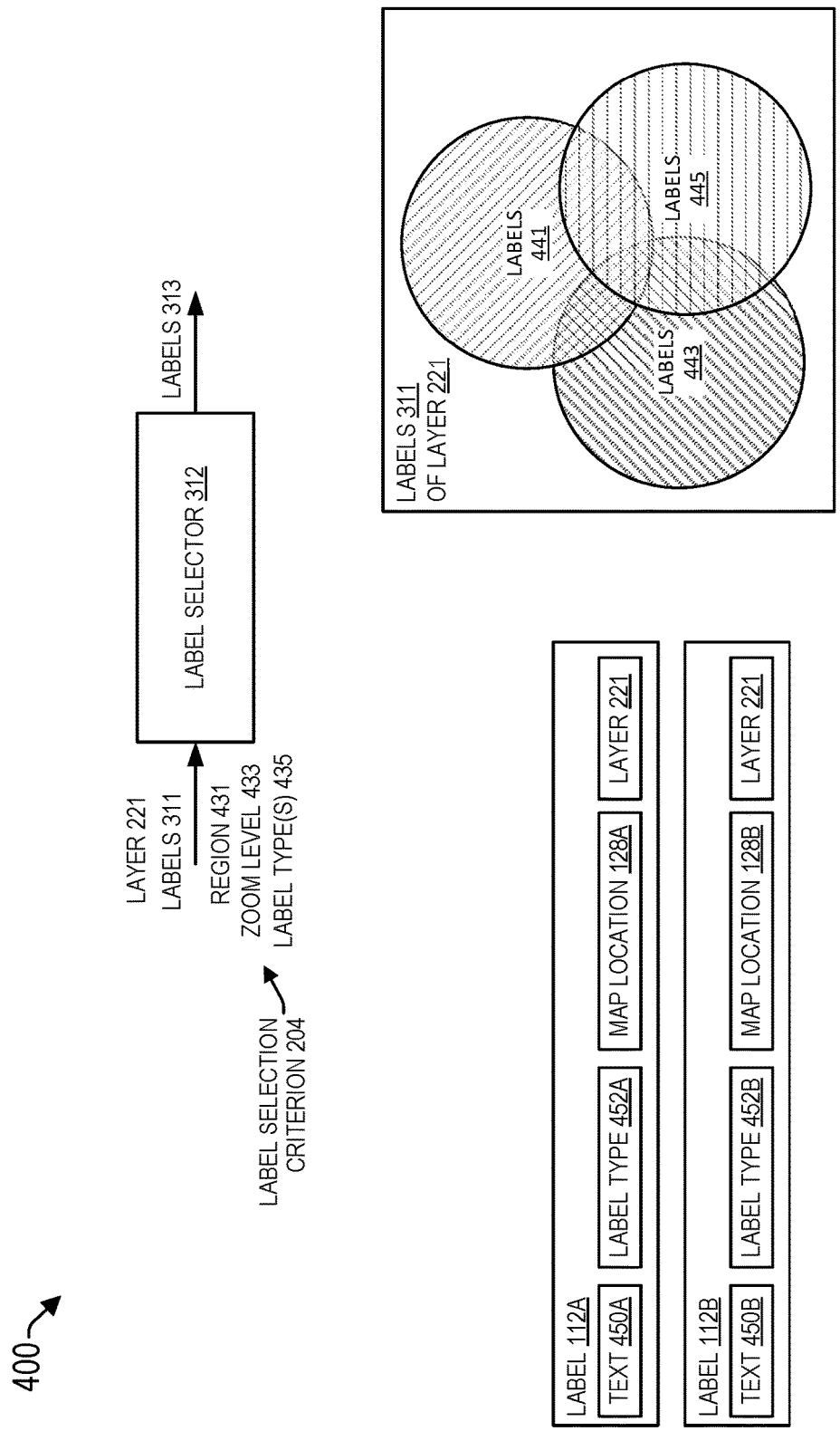
FIG. 4 is a diagram that illustrates examples of operations performed by a label selector of the layer bounding box generator of FIG. 3.

Referring to FIG. 4, a diagram 400 is shown of examples of operations performed by the label selector 312. The label selector 312 obtains the labels 311 of the layer 221. In an example, the labels 311 include a label 112A, a label 112B, one or more additional labels, or a combination thereof.

The label 112A identifies a map location 128A. For example, the label 112A includes text 450A that identifies the map location 128A. The label 112A including the text 450A identifying the map location 128A is provided as an illustrative example. In other examples, the label 112A can include the text 450A, an image, a graphic, another type of identifier, or a combination thereof, that identifies the map location 128A. In a particular aspect, the label 112A includes a label type 452A indicating that the label 112A identifies a particular type of map location. For example, the label type 452A can include a navigation aid (navaid) label type, a way point label type, a route label type, an airport label type, an airway label type, an airspace label type, or another label type.

Similarly, the label 112B includes text 450B, an image, a graphic, another type of identifier, or a combination thereof, that identifies the map location 128B. In a particular aspect, the label 112B includes a label type 452B indicating that the label 112B identifies a particular type of map location.

In some implementations, one or more layer label types are associated with the layer 221 and the label selector 312 obtains the labels 311 associated with the one or more layer label types. In an example, the one or more layer label types include the label type 452A, the label type 452B, one or more additional label types, or a combination thereof. In a particular aspect, a user input, a configuration setting, default data, or a combination thereof, indicate the one or more layer label types associated with the layer 221.

In a particular aspect, the label selector 312 selects a subset of the labels 311 that is to be included in the map 119 for the layer 221. To illustrate, the label selector 312 selects, based on a label selection criterion 204, labels 313 from the labels 311. For example, the label selector 312, in response to determining that the label 112A satisfies the label selection criterion 204, includes the label 112A in the labels 313. In a particular example, the label selector 312, in response to determining that one or more additional labels of the labels 311 satisfy the label selection criterion 204, includes the one or more additional labels in the labels 313.

In a particular aspect, the label selection criterion 204 indicates a region criterion corresponding to a region 431 (e.g., a geographical region), a zoom criterion corresponding to a zoom level 433, a label type criterion corresponding to one or more label types 435, or a combination thereof. For example, the label selection criterion 204 indicates that the map 119 (to be generated) is of the region 431. A first set of map locations 128 associated with the one or more layer label types are included in the region 431 for the layer 221. In a particular aspect, the label selector 312 filters the labels 311 based on the first set of map locations 128. For example, the label selector 312, in response to determining that labels 441 of the labels 311 identify the first set of map locations 128 of the region 431 for the layer 221, determines that the labels 441 satisfy the region criterion indicated by the label selection criterion 204.

In some examples, the label selection criterion 204 indicates that the map 119 (to be generated) is to correspond to the zoom level 433. Labels of one or more zoom label types (of the one or more layer label types) are to be displayed at the zoom level 433 for the layer 221. For example, at a first zoom level, labels (e.g., airway labels) corresponding to airways between cities are to be displayed for the layer 221. At a second zoom level, labels (e.g., airport labels) corresponding to runways at an airport are to be displayed for the layer 221. In a particular aspect, the label selector 312 filters the labels 311 based on the one or more zoom label types. For example, the label selector 312, in response to determining that labels 443 of the labels 311 are of the one or more label types associated with the zoom level 433 for the layer 221, determines that the labels 443 satisfy the zoom criterion indicated by the label selection criterion 204.

In some examples, the label selection criterion 204 indicates that the map 119 (to be generated) is to include labels of the one or more label types 435 for the layer 221. In a particular aspect, the label selector 312 filters the labels 311 based on the one or more label types 435. For example, the label selector 312, in response to determining that labels 445 of the labels 311 are of the one or more label types 435 indicated by the label selection criterion 204, determines that the labels 445 satisfy the label type criterion indicated by the label selection criterion 204.

In some implementations, the labels 445 are a subset of the labels 311 indicating that the one or more label types 435 are a subset of the one or more layer label types of the layer 221. In alternative implementations, the labels 445 can include one or more additional labels that are not included in the labels 311. For example, the one or more label types 435 can include at least one label type that is not included in the one or more layer label types of the layer 221. To illustrate, a user can use the one or more label types 435 to add labels of label types in the layer 221 that are not typically (e.g., by default) included in the layer 221.

In a particular aspect, the label selection criterion 204 indicates a single one of the region criterion, the zoom criterion, or the label type criterion, and the label selector 312 selects the labels (e.g., the labels 441, the labels 443, or the labels 445) that satisfy the single one of the region criterion, the zoom criterion, or the label type criterion as the labels 313.

In a particular aspect, the label selection criterion 204 indicates multiple of the region criterion, the zoom criterion, or the label type criterion, and the label selector 312 selects an intersection of corresponding labels as the labels 313. For example, the label selector 312, in response to determining that the label selection criterion 204 indicates the region criterion, the zoom criterion, and the label type criterion, selects an intersection of the labels 441, the labels 443, and the labels 445 as the labels 313.

In a particular aspect, the label selection criterion 204 indicates multiple of the region criterion, the zoom criterion, or the label type criterion, and the label selector 312 selects a combination of corresponding labels as the labels 313. For example, the label selector 312, in response to determining that the label selection criterion 204 indicates the region criterion, the zoom criterion, and the label type criterion, selects a combination of the labels 441, the labels 443, and the labels 445 as the labels 313. In some aspects, a configuration setting, a user input, default data, or a combination thereof, indicates whether an intersection or a combination of labels are to be selected.

Figure 5:
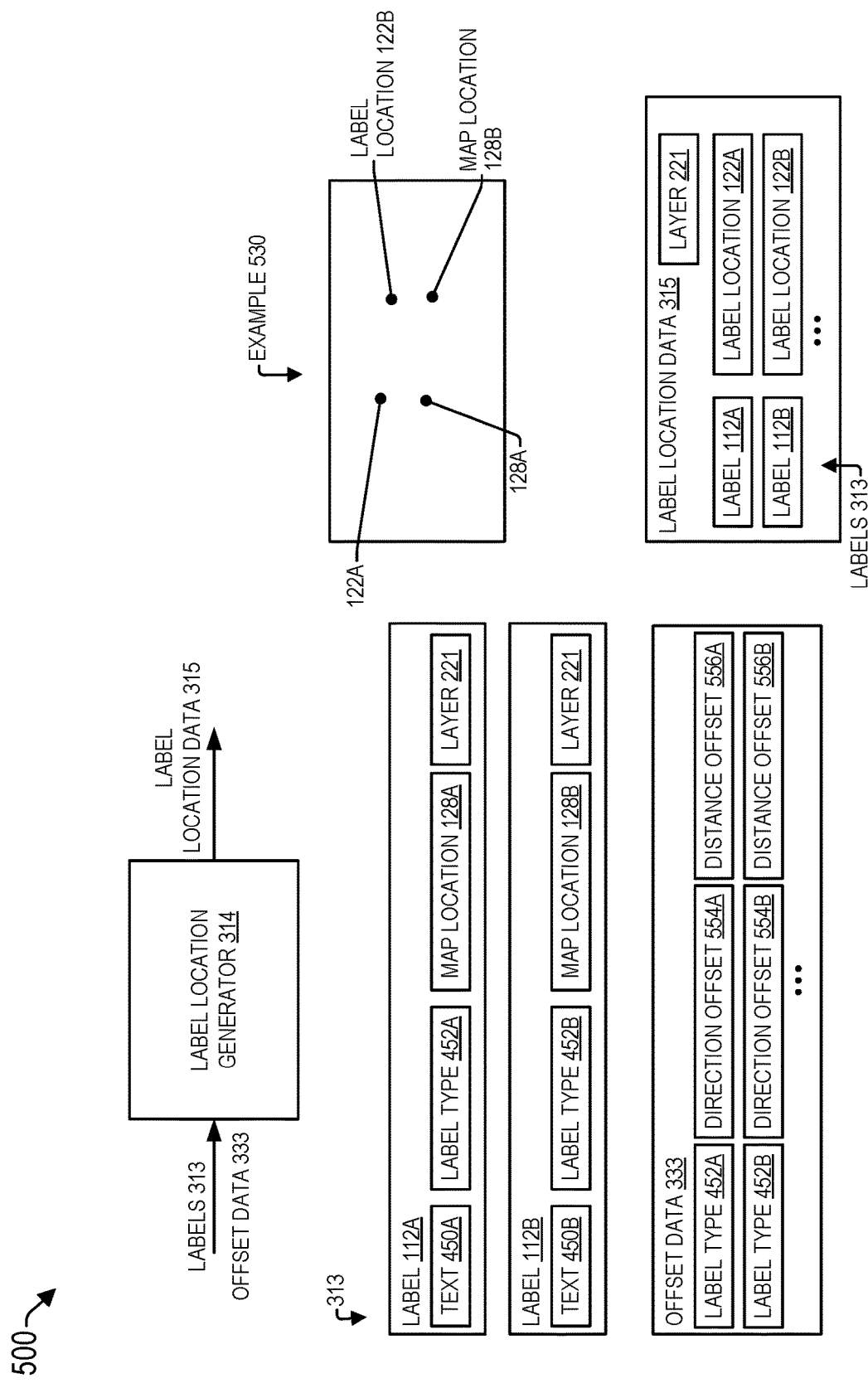
FIG. 5 is a diagram that illustrates examples of operations performed by a label location generator of the layer bounding box generator of FIG. 3.

Referring to FIG. 5, a diagram 500 is shown of examples of operations performed by the label location generator 314. The label location generator 314 is configured to generate, based on the offset data 333, label location data 315 indicating label locations 122 of the labels 313 of the layer 221.

In a particular aspect, the offset data 333 indicates a direction offset 554, a distance offset 556, or both, associated with a label type 452. For example, the offset data 333 indicates that a direction offset 554A, a distance offset 556A, or both, are associated with a label type 452A. As another example, the offset data 333 indicates that a direction offset 554B, a distance offset 556B, or both, are associated with a label type 452B. The offset data 333 including offsets for two label types is provided as an illustrative example. In other examples, the offset data 333 can indicate offsets for a single label type or for more than two label types.

The label location generator 314 determines label locations 122 of the labels 313 based on the map locations 128 and the offsets indicated by the offset data 333. In an example 530, the label location generator 314, in response to determining that the labels 313 include a label 112A identifying a map location 128A that is of a label type 452A and that the offset data 333 indicates that the label type 452A is associated with the direction offset 554A, the distance offset 556A, or both, determines a label location 122A based on applying the direction offset 554A, the distance offset 556A, or both, to the map location 128A (or a map location symbol of the label type 452A). In an example, the direction offset 554A (e.g., a value greater than or equal to 0 degrees and less than 360 degrees) indicates a direction of the label location 122A relative to the map location 128A (or the map location symbol of the label type 452A). In another example, the distance offset 556A indicates a distance of the label location 122A from the map location 128A (or the map location symbol of the label type 452A). To illustrate, the distance offset 556A indicates a Cartesian distance between coordinates of the label location 122A and coordinates of the map location 128A (or the map location symbol of the label type 452A).

Similarly, the label location generator 314, in response to determining that the labels 313 include a label 112B identifying a map location 128B that is of a label type 452B and that the offset data 333 indicates that the label type 452B is associated with the direction offset 554B, the distance offset 556B, or both, determines a label location 122B based on applying the direction offset 554B, the distance offset 556B, or both, to the map location 128B (or a map location symbol of the label type 452B).

The label location generator 314 generates the label location data 315 indicating the label locations 122 of the labels 313 of the layer 221. For example, the label location data 315 indicates that the label 112A has the label location 122A, the label 112B has the label location 122B, one or more additional labels of the labels 313 have corresponding label locations, or a combination thereof. In a particular aspect, the label locations 122 correspond to default locations of the labels 313 in the map 119 (to be generated).

Figure 6:
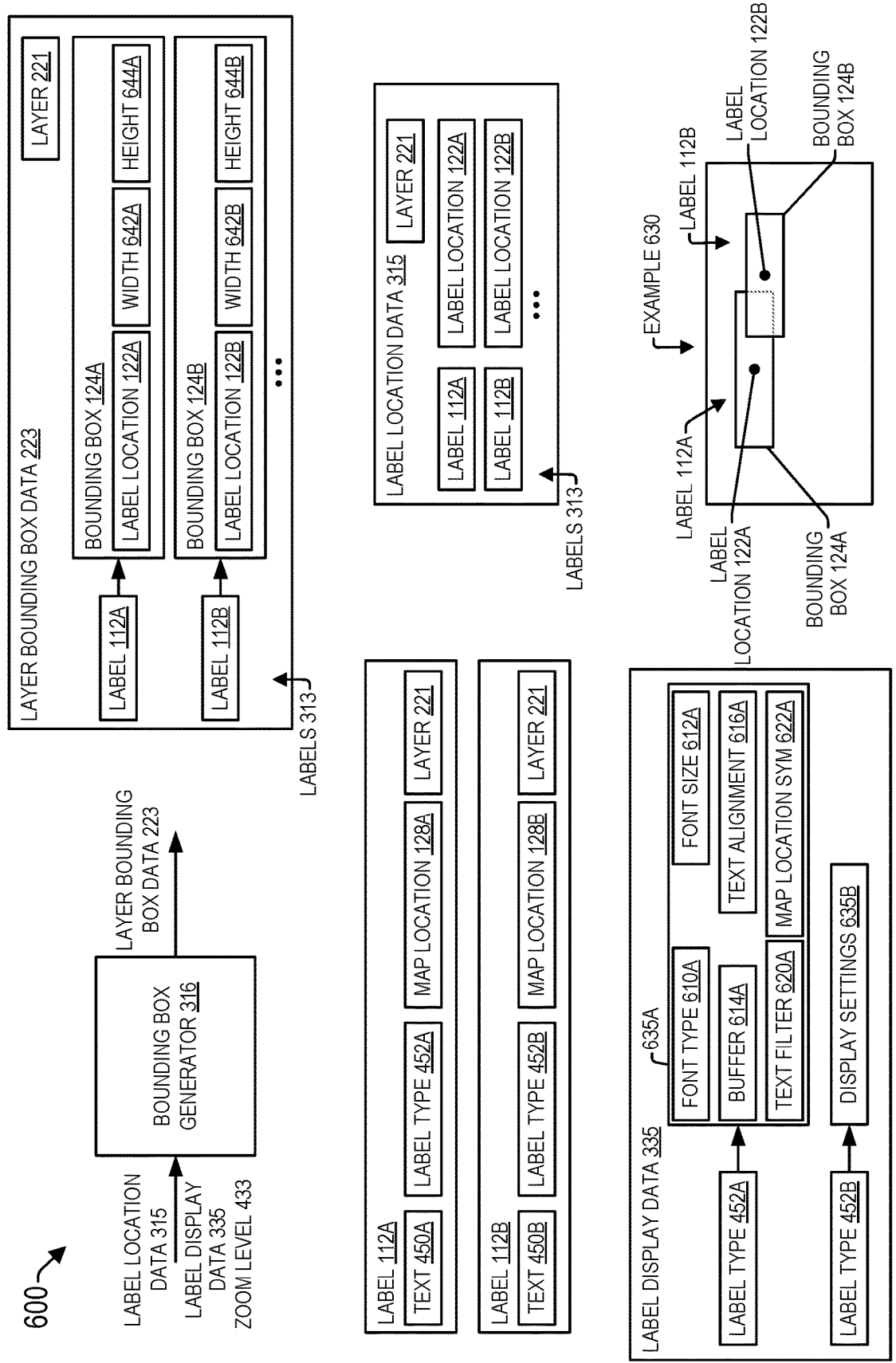
FIG. 6 is a diagram that illustrates examples of operations performed by a bounding box generator of the layer bounding box generator of FIG. 3.

Referring to FIG. 6, a diagram 600 illustrates examples of operations performed by the bounding box generator 316. The bounding box generator 316 is configured to generate, based on the label location data 315, the zoom level 433, the label display data 335, or a combination thereof, layer bounding box data 223 indicating bounding boxes 124 of the labels 313 of the layer 221.

The label display data 335 indicates display settings 635 associated with the label types 452. For example, the label display data 335 indicates display settings 635A of the label type 452A, display settings 635B of the label type 452B, display settings of one or more additional label types or a combination thereof. To illustrate, the display settings 635A indicate that a label of the label type 452A is to be displayed with a font type 610A, a font size 612A, a buffer 614A, a text alignment 616A, a text filter 620A, a map location symbol 622A, or a combination thereof. In a particular implementation, the label display data 335 includes display settings associated with various zoom levels. For example, the display settings 635A are associated with the zoom level 433 and indicate how labels of the label type 452A are to be displayed for the zoom level 433.

In a particular aspect, the label 112A is of the label type 452A. The bounding box generator 316, based on the display settings 635A, determines that the buffer 614A indicates space to be included around text (or another type of identifier) to be displayed for the label 112A. In some implementations, the buffer 614A includes a top buffer, a bottom buffer, a left side buffer, a right side buffer, or a combination thereof. The text alignment 616A (e.g., a value greater than or equal to 0 and less than 360, a value indicating horizontal or vertical alignment, etc.) indicates an alignment of the text (or another type of identifier) to be displayed for the label 112A. The text filter 620A indicates how the text 450A is to be processed to generate the text to be displayed for the label 112A. For example, the text filter 620A can indicate that a word included in the text 450A (e.g., "runway") is to be substituted with one or more characters (e.g., "RWY").

The bounding box generator 316, based on the display settings 635A and the text 450A, determines dimensions (e.g., a width 642A, a height 644A, or both) of a bounding box 124A of the label 112A. For example, the bounding box generator 316 determines a text size of the text to be displayed for the label 112A based on the font type 610A, the font size 612A, or both. The bounding box generator 316 determines the dimensions of the bounding box 124A based on the text size, the buffer 614A, the text alignment 616A, or a combination thereof. Similarly, the bounding box generator 316, based on the display settings 635B and the text 450B, determines dimensions (e.g., a width 642B, a height 644B, or both) of a bounding box 124B of the label 112B. In some aspects, the display settings 635A can have one or more settings in common with the display settings 635B. In some aspects, the display settings 635A can have one or more settings that are distinct from the display settings 635B.

The bounding box generator 316 determines, based on the label location 122A, the bounding box 124A of the label 112A. For example, the label location 122A has coordinates including a horizontal coordinate ($X_L$) and a vertical coordinate ($Y_L$). A top-left vertex of the bounding box 124A has a horizontal coordinate ($X_{TL}$) that is based on the horizontal coordinate ($X_L$) of the label location 122A and the width 642A (e.g., $X_{TL}=X_L-0.5$ (width 642A)). The top-left vertex of the bounding box 124A has a vertical coordinate ($Y_{TL}$) that is based on the vertical coordinate ($Y_L$) of the label location 122A and the height 644A (e.g., $Y_{TL}=Y_L+0.5$ (height 644A)).

A bottom-right vertex of the bounding box 124A has a horizontal coordinate ($X_{BR}$) that is based on the horizontal coordinate ($X_L$) of the label location 122A and the width 642A (e.g., $X_{BR}=X_L+0.5$ (width 642A)). The bottom-right vertex of the bounding box 124A has a vertical coordinate ($Y_{BR}$) that is based on the vertical coordinate ($Y_L$) of the label location 122A and the height 644A (e.g., $Y_{BR}=Y_L-0.5$ (height 644A)). Similarly, the bounding box generator 316 determines, based on the label location 122B, the bounding box 124B of the label 112B.

The bounding box generator 316 generates the layer bounding box data 223 for the layer 221 indicating that the label 112A has the bounding box 124A, the label 112B has the bounding box 124B, one or more additional labels of the labels 313 have corresponding bounding boxes 124, or a combination thereof. In an example 630, the bounding box generator 316 generates the layer bounding box data 223 indicating that the label 112A has the bounding box 124A at the label location 122A and that the label 112B has the bounding box 124B at the label location 122B.

Figure 7A:
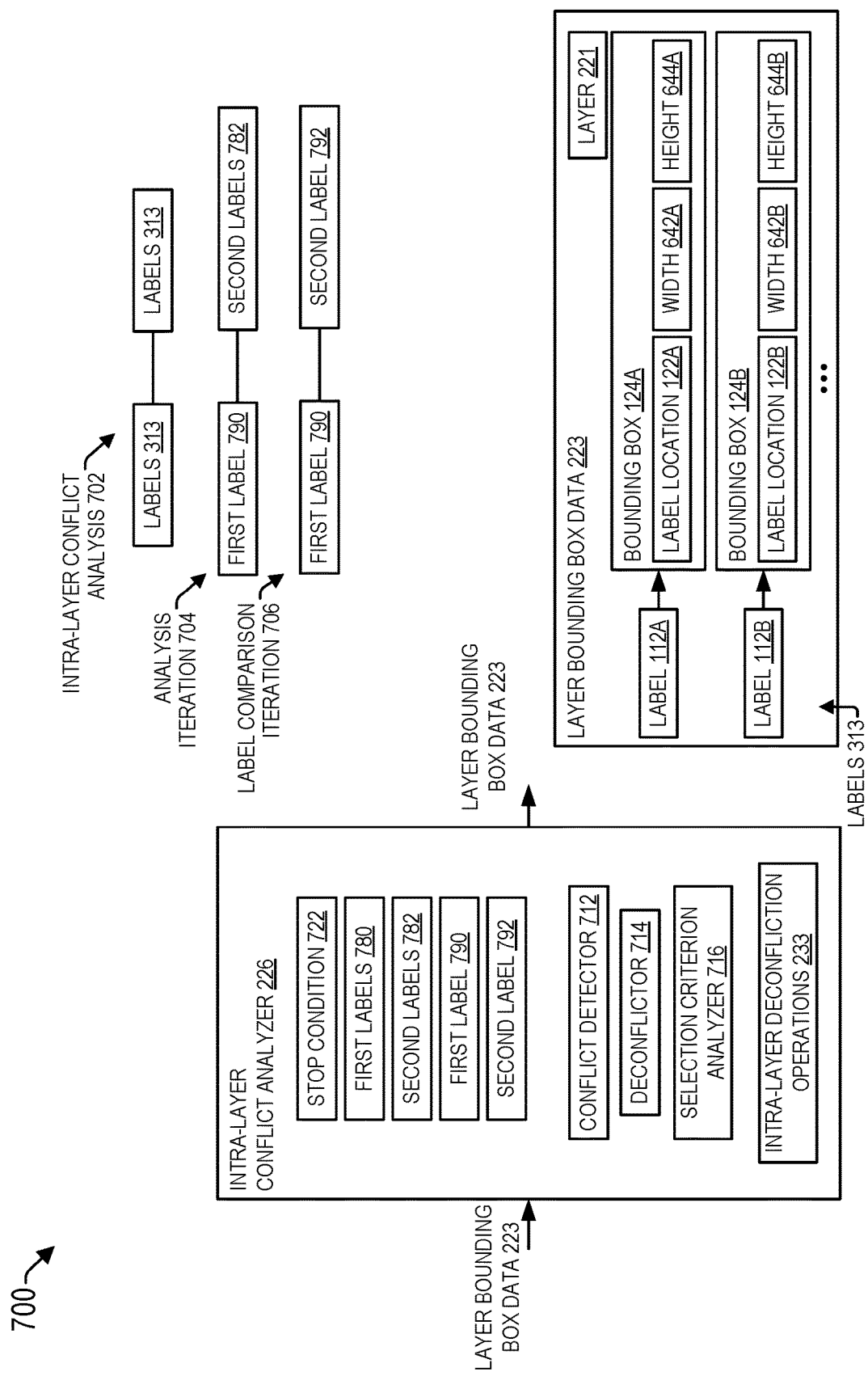
FIG. 7A is a diagram that illustrates examples of operations performed by an intra-layer conflict analyzer of the map generator of FIG. 1.

Referring to FIG. 7A, a diagram 700 illustrates examples of operations performed by the intra-layer conflict analyzer 226. The intra-layer conflict analyzer 226 includes a conflict detector 712 coupled via a deconflictor 714 to a selection criterion analyzer 716.

The intra-layer conflict analyzer 226 is configured to perform intra-layer deconfliction operations 233 for the layer 221. For example, the intra-layer deconfliction operations 233 include one or more operations performed by the conflict detector 712, the deconflictor 714, the selection criterion analyzer 716, the intra-layer conflict analyzer 226, or a combination thereof.

In an example, the conflict detector 712 is configured to determine, based on the layer bounding box data 223, whether a conflict exists between at least a pair of the labels 313 of the layer 221, as further described with reference to FIG. 7B. The deconflictor 714 is configured to generate candidate label locations of the pair of the labels 313 of the layer 221 to resolve the conflict, as further described with reference to FIG. 7C. The selection criterion analyzer 716 is configured to determine whether a candidate label location satisfies a selection criterion, as further described with reference to FIG. 7D.

In a particular implementation, the intra-layer conflict analyzer 226, in response to receiving layer bounding box data 223 of a layer 221 from the layer bounding box generator 222 of FIG. 2, performs intra-layer conflict analysis 702 until a stop condition 722 is detected. In a particular aspect, the stop condition 722 includes detecting that a threshold count of iterations have been performed, detecting that a timer has expired, determining that no conflicts are detected between any pair of labels 313 of the layer 221, or a combination thereof.

In a particular aspect, the intra-layer conflict analysis 702 corresponds to a comparison of each of the labels 313 of the layer 221 with others of the labels 313 of the layer 221 to determine whether a conflict is detected. In a particular implementation, the intra-layer conflict analyzer 226 initializes first labels 780 to include the labels 313. The first labels 780 correspond to labels that are remaining for the intra-layer conflict analysis 702. The intra-layer conflict analyzer 226 performs one or more analysis iterations 704 during the intra-layer conflict analysis 702 to compare each of the labels 313 to others of the labels 313.

The intra-layer conflict analyzer 226, in response to determining that the first labels 780 include at least one label, determines that an analysis iteration 704 is to be performed. During an analysis iteration 704, the intra-layer conflict analyzer 226 performs a conflict analysis of one of the first labels 780. As an example, the intra-layer conflict analyzer 226 removes a particular label 112 (e.g., the label 112A) from the first labels 780, and designates the particular label 112 as a first label 790. The first label 790 corresponds to a label that is being analyzed during the analysis iteration 704. The intra-layer conflict analyzer 226 initializes second labels 782 with all of the labels 313 other than the first label 790. The second labels 782 correspond to labels that are to be compared with the first label 790 during the analysis iteration 704.

The intra-layer conflict analyzer 226 performs one or more label comparison iterations 706 during the analysis iteration 704 to compare the first label 790 to each of the second labels 782. During a label comparison iteration 706, the intra-layer conflict analyzer 226 performs a comparison of the first label 790 with one of the second labels 782. As an example, the intra-layer conflict analyzer 226 removes a particular label 112 (e.g., the label 112B) from the second labels 782, and designates the particular label 112 as a second label 792. The first label 790 is compared to the second label 792 during the label comparison iteration 706. The intra-layer conflict analyzer 226 provides the first label 790 and the second label 792 to the conflict detector 712.

The conflict detector 712 performs a comparison of the first label 790 and the second label 792 based on the layer bounding box data 223, as further described with reference to FIG. 7B. The intra-layer conflict analyzer 226, in response to determining that the conflict detector 712 indicates no conflict between the first label 790 and the second label 792, determines that the label comparison iteration 706 has ended successfully. Alternatively, the intra-layer conflict analyzer 226, in response to determining that the conflict detector 712 indicates a conflict between the first label 790 and the second label 792, provides the bounding boxes of the first label 790 and the second label 792 to the deconflictor 714.

The deconflictor 714 determines candidate label locations of the first label 790 and the second label 792 based on bounding boxes of the first label 790 and the second label 792, as further described with reference to FIG. 7C. In a particular example, the first label 790 includes the label 112A and the second label 792 includes the label 112B. In this example, the deconflictor 714 determines the candidate label location 126A and the candidate label location 126B based on the bounding box 124A of the label 112A and the bounding box 124B of the label 112B.

The intra-layer conflict analyzer 226 provides candidate label locations (e.g., the candidate label location 126A and the candidate label location 126B) to the selection criterion analyzer 716. The selection criterion analyzer 716 determines whether each of the candidate label locations satisfies a corresponding selection criterion, as further described with reference to FIG. 7D.

The intra-layer conflict analyzer 226, in response to determining that each of the candidate label locations (e.g., the candidate label location 126A and the candidate label location 126B) satisfies a corresponding selection criterion, determines that a label location of at least one of the first label 790 or the second label 792 is to be updated. For example, the intra-layer conflict analyzer 226, in response to determining that the label location 122A is distinct from the candidate label location 126A, updates the layer bounding box data 223 to set the label location 122A of the bounding box 124A to indicate the candidate label location 126A, and resets the second labels 782 to include all of the labels 313 other than the first label 790 (e.g., the label 112A). To illustrate, since the first label 790 (e.g., the label 112A) has moved, the second labels 782 are reset so that subsequent label comparison iterations also include any of the labels 313 to which the first label 790 has already been compared. As another example, the intra-layer conflict analyzer 226, in response to determining that the label location 122B is distinct from the candidate label location 126B, updates the layer bounding box data 223 to set the label location 122B to indicate the candidate label location 126B and, if the label 112B is not included in the first labels 780, adds the label 112B to the first labels 780. To illustrate, since the label 112B has moved, if an analysis iteration 704 of the label 112B has already been performed, the label 112B is added back to the first labels 780 so that an analysis iteration 704 of the label 112B can be performed again. The intra-layer conflict analyzer 226, in response to determining that each of the candidate label locations (e.g., the candidate label location 126A and the candidate label location 126B) satisfies a corresponding selection criterion, determines that the label comparison iteration 706 has ended.

In some implementations, the intra-layer conflict analyzer 226, in response to determining that at least one of the candidate label locations (e.g., the candidate label location 126A, the candidate label location 126B, or both) fails to satisfy a corresponding selection criterion, uses the deconflictor 714, the selection criterion analyzer 716, or both, to process the first label 790 and the second label 792 again. For example, the intra-layer conflict analyzer 226 provides the bounding boxes of the first label 790 and the second label 792 to the deconflictor 714. In some examples, the intra-layer conflict analyzer 226 provides the candidate label locations of the first label 790 and the second label 792 to the deconflictor 714.

In a particular aspect, the deconflictor 714 generates an output indicating that all available candidate label locations for the first label 790, the second label 792, or both, have been previously generated during the label comparison iteration 706. The intra-layer conflict analyzer 226, in response to receiving the output from the deconflictor 714, determines that the label comparison iteration 706 has ended unsuccessfully.

Alternatively, the deconflictor 714 generates an updated version of the candidate label locations, as further described with reference to FIG. 7C, and the intra-layer conflict analyzer 226 provides the updated candidate label locations to the selection criterion analyzer 716. The label comparison iteration 706 continues with the selection criterion analyzer 716 determining whether each of the updated candidate label locations satisfies the corresponding selection criterion.

In some implementations, the intra-layer conflict analyzer 226, in response to determining that one (e.g., the candidate label location 126A) of the candidate label locations satisfies a first selection criterion and that the other (e.g., the candidate label location 126B) of the candidate label locations fails to satisfy a second selection criterion, generates an updated version of the candidate label location 126B based on the candidate label location 126A and the candidate label location 126B, and provides the updated version of the candidate label location 126B to the selection criterion analyzer 716. In these implementations, the intra-layer conflict analyzer 226 refrains from generating an updated version of the candidate label location 126A in response to determining that the candidate label location 126A satisfies the first selection criterion. The label comparison iteration 706 continues with the selection criterion analyzer 716 determining whether the updated candidate label location satisfies the corresponding selection criterion.

In some implementations, the intra-layer conflict analyzer 226, in response to determining that the label comparison iteration 706 has ended unsuccessfully, refrains from updating the label locations of the first label 790 (e.g., the label 112A) and the second label 792 (e.g., the label 112B). In these implementations, the intra-layer conflict analyzer 226 generates a notification indicating a conflict between the label 112A at the label location 122A and the label 112B at the label location 122B.

In some implementations, the intra-layer conflict analyzer 226, in response to determining that the label comparison iteration 706 has ended unsuccessfully, sets the label locations of the first label 790 and the second label 792 to the candidate label locations, and generates a notification indicating that a corresponding selection criterion is not satisfied. For example, the intra-layer conflict analyzer 226, in response to determining that the candidate label location 126A is distinct from the label location 122A, updates the layer bounding box data 223 to set the label location 122A of the bounding box 124A to indicate the candidate label location 126A and resets the second labels 782 to include all of the labels 313 other than the first label 790 (e.g., the label 112A). Similarly, the intra-layer conflict analyzer 226, in response to determining that the candidate label location 126B is distinct from the label location 122B, updates the layer bounding box data 223 to set the label location 122B to indicate the candidate label location 126B and, if the label 112B is not included in the first labels 780, adds the label 112B to the first labels 780.

The intra-layer conflict analyzer 226 generates a notification indicating that the label 112B at the candidate label location 126B fails to satisfy the second selection criterion. In a particular aspect, the intra-layer conflict analyzer 226 adds the notification (e.g., of a detected conflict or failure to satisfy a selection criterion) to the layer bounding box data 223. The map generator 104, when generating the map 119 (or map data), includes the notification in the map 119, the map data, an alert, or a combination thereof.

In some implementations, the intra-layer conflict analyzer 226, in response to determining that the label comparison iteration 706 has ended, determines whether the stop condition 722 is detected. In a particular aspect, the intra-layer conflict analyzer 226, in response to determining that the label comparison iteration 706 has ended and that the stop condition 722 is not detected, determines whether another label comparison iteration 706 is to be performed with the first label 790. For example, the intra-layer conflict analyzer 226, in response to determining that the second labels 782 include at least one label to be compared to the first label 790, initiates another label comparison iteration 706. To illustrate, the intra-layer conflict analyzer 226 removes a particular label 112 from the second labels 782 and designates the particular label 112 as the second label 792. The intra-layer conflict analyzer 226 provides the first label 790 and the second label 792 to the conflict detector 712. Alternatively, the intra-layer conflict analyzer 226, in response to determining that there are no labels in the second labels 782, determines that the analysis iteration 704 has ended.

In some implementations, the intra-layer conflict analyzer 226, in response to determining that the analysis iteration 704 has ended, determines whether the stop condition 722 is detected. In a particular aspect, the intra-layer conflict analyzer 226, in response to determining that the analysis iteration 704 has ended and that the stop condition 722 is not detected, determines whether another analysis iteration 704 is to be performed with another label selected as the first label 790. For example, the intra-layer conflict analyzer 226, in response to determining that the first labels 780 include at least one label to be analyzed, initiates another analysis iteration 704. To illustrate, the intra-layer conflict analyzer 226 removes a particular label 112 (e.g., the label 112B) from the first labels 780 and designates the particular label 112 as the first label 790. The intra-layer conflict analyzer 226 initializes the second labels 782 with all labels from the labels 313 other than the first label 790. The intra-layer conflict analyzer 226 performs one or more label comparison iterations 706 to compare the first label 790 to the second labels 782.

The intra-layer conflict analyzer 226, in response to determining that there are no labels in the first labels 780, determines that the stop condition 722 is detected. In a particular aspect, detecting the stop condition 722 includes detecting that a threshold count of label comparison iteration 706 have been performed, detecting that a threshold count of analysis iteration 704 have been performed, detecting that a timer has expired, determining that no conflicts are detected between any pair of labels 313 of the layer 221, determining that there are no labels in the first labels 780, or a combination thereof.

The intra-layer conflict analyzer 226, in response to determining that the stop condition 722 is detected, determines that the intra-layer conflict analysis 702 has ended and provides the layer bounding box data 223 of the layer 221 to the inter-layer conflict analyzer 228.

In some examples, the label location 122A indicated by the layer bounding box data 223 corresponds to the label location 122A generated by the label location generator 314. For example, the label location 122A has not been updated by the intra-layer conflict analyzer 226. In some examples, the label location 122A indicated by the layer bounding box data 223 corresponds to the candidate label location 126A generated by the deconflictor 714. For example, the label location 122A has been updated by the intra-layer conflict analyzer 226 to resolve a conflict.

A technical advantage of the intra-layer conflict analyzer 226 resolving the conflicts prior to generating (e.g., rendering) the map 119 can include using less time and fewer computing resources as compared to moving labels in a rendered map. With conflicts resolved prior to rendering, the map 119 can be rendered with resolved conflicts faster and aid navigation in time-critical situations.

Figure 7B:
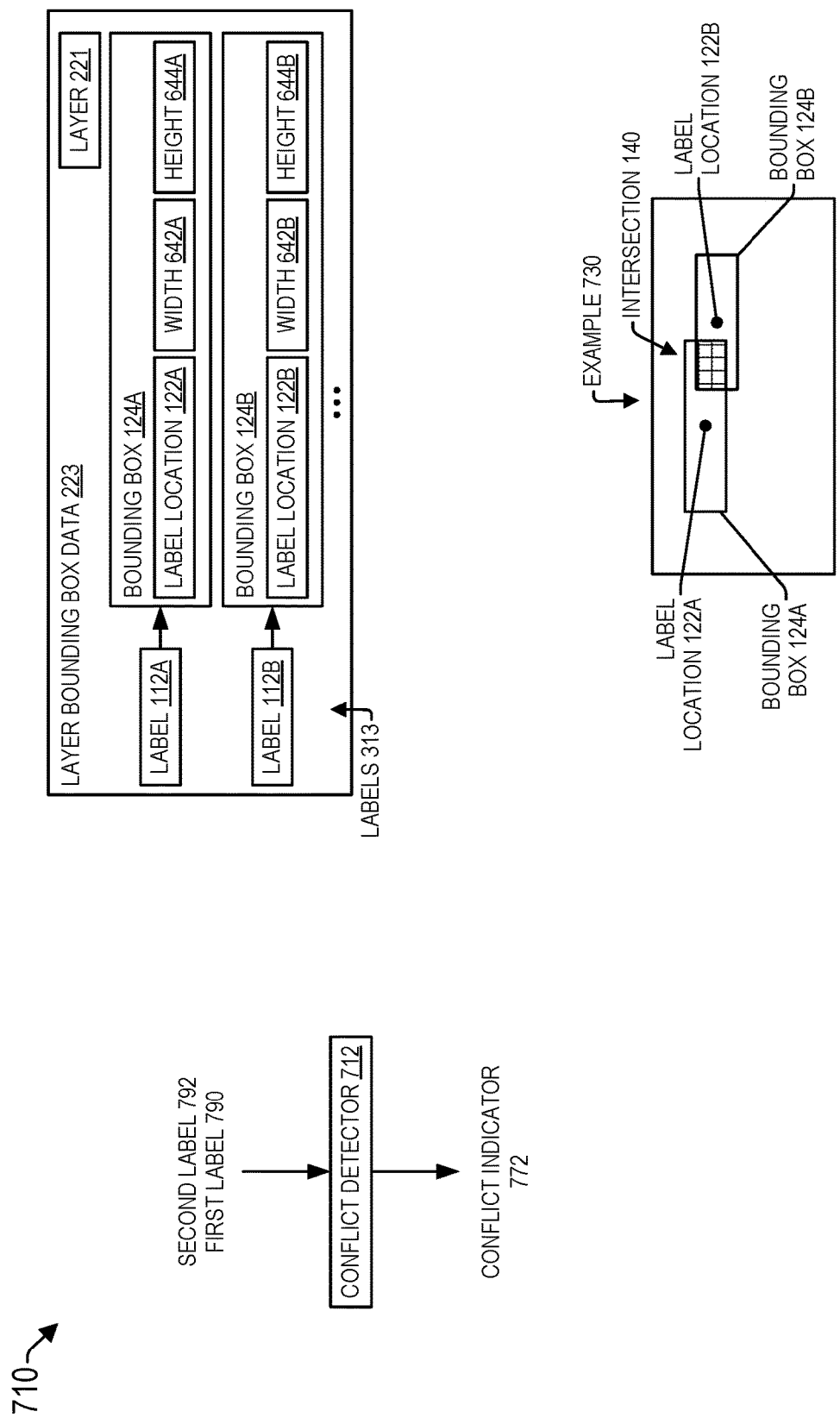
FIG. 7B is a diagram that illustrates examples of operations performed by a conflict detector of the intra-layer conflict analyzer of FIG. 7A.

Referring to FIG. 7B, a diagram 710 illustrates examples of operations performed by the conflict detector 712. The conflict detector 712 is configured to generate a conflict indicator 772 indicating whether a conflict is detected between the first label 790 and the second label 792 during a label comparison iteration 706.

The conflict detector 712 performs a comparison of the first label 790 and the second label 792 based on the layer bounding box data 223. In an example, the first label 790 is the label 112A and the second label 792 is the label 112B. In this example, the conflict detector 712 determines whether the bounding box 124A of the label 112A overlaps the bounding box 124B of the label 112B. In a particular aspect, the conflict detector 712 determines that the bounding box 124A overlaps the bounding box 124B in response to determining that at least one vertex of the bounding box 124A is within the bounding box 124B, at least one vertex of the bounding box 124B is within the bounding box 124A, or both. In a particular aspect, the conflict detector 712 determines that the bounding box 124A overlaps the bounding box 124B in response to determining that the label location 122A is the same as the label location 122B and that the bounding box 124A has the same dimensions as the bounding box 124B (e.g., the width 642A is the same as the width 642B and the height 644A is the same as the height 644B).

The conflict detector 712 determines whether a particular vertex is within a bounding box based on comparing vertex coordinates of the bounding box with coordinates of the particular vertex. For example, the conflict detector 712 determines coordinates $(X_{TL}, Y_{TL})$ of the top-left vertex of the bounding box 124A based on coordinates $(X_L, Y_L)$ of the label location 122A, the width 642A, and the height 644A, as described with reference to FIG. 6. The conflict detector 712 determines coordinates $(X_{BR}, Y_{BR})$ of the bottom-right vertex of the bounding box 124A based on coordinates $(X_L, Y_L)$ of the label location 122A, the width 642A, and the height 644A, as described with reference to FIG. 6. The conflict detector 712 determines that a vertex (X, Y) of the bounding box 124B is within the bounding box 124A based on determining that X is greater than $X_{TL}$ and less than $X_{BR}$ and Y is greater than $Y_{BR}$ and less than $Y_{TL}$. In an example 730, a top-left vertex of the bounding box 124B is within the bounding box 124A and a bottom-right vertex of the bounding box 124A is within the bounding box 124B.

The conflict detector 712, in response to determining that the bounding box 124A overlaps the bounding box 124B, generates the conflict indicator 772 having a first value (e.g., 1) indicating a conflict between the first label 790 and the second label 792. Alternatively, the conflict detector 712, in response to determining that the bounding box 124A does not overlap the bounding box 124B, generates the conflict indicator 772 having a second value (e.g., 0) indicating no conflict between the first label 790 and the second label 792.

Figure 7C:
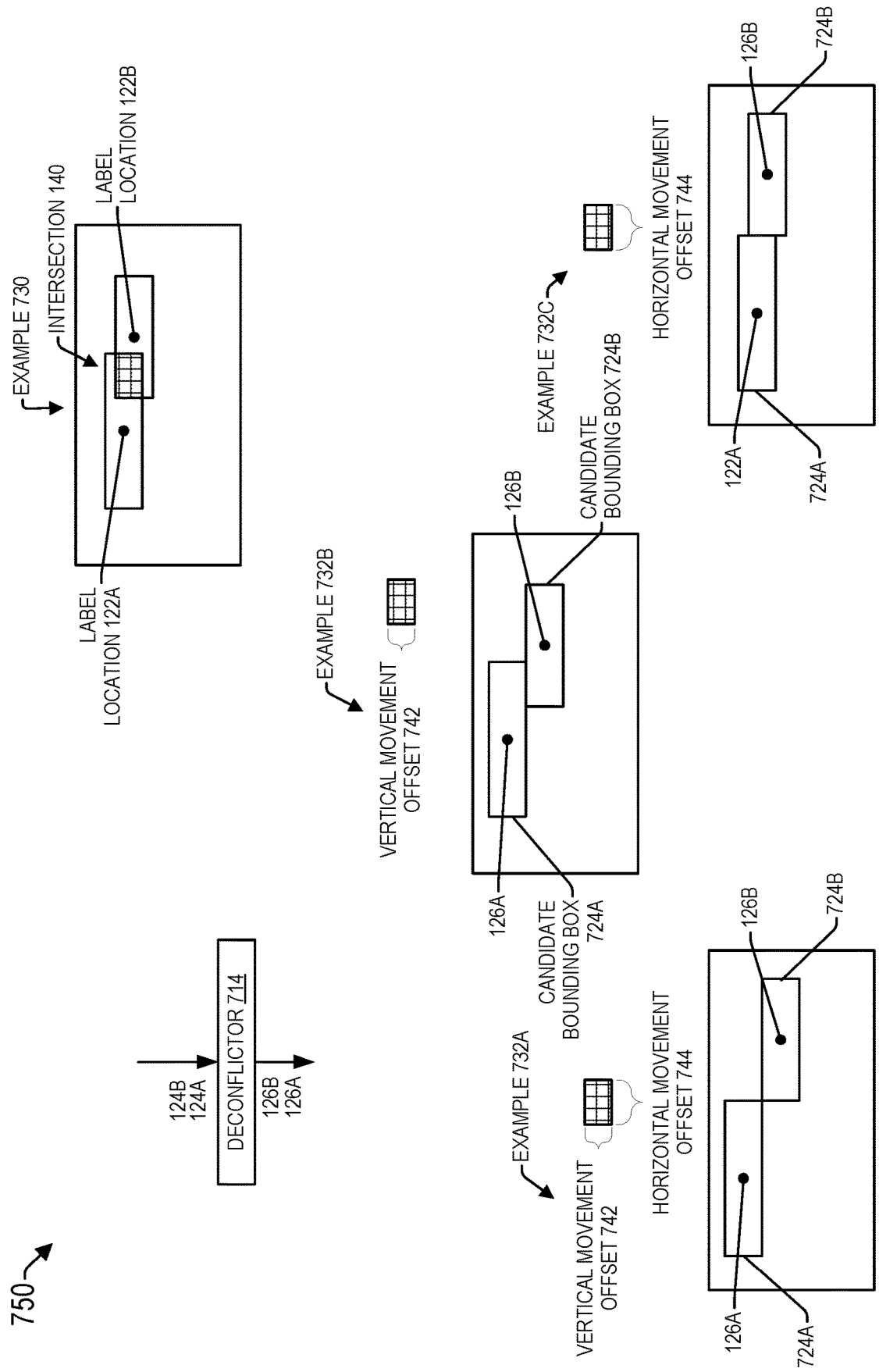
FIG. 7C is a diagram that illustrates examples of operations performed by a deconflictor of the intra-layer conflict analyzer of FIG. 7A.

Referring to FIG. 7C, a diagram 750 is shown that illustrates examples of operations performed by the deconflictor 714. The deconflictor 714 is configured to generate a pair of candidate label locations 126 to resolve a conflict between a pair of bounding boxes 124.

The deconflictor 714 determines an intersection 140 of the bounding boxes of the first label 790 and the second label 792. In an example in which the first label 790 is the label 112A and the second label 792 is the label 112B, the deconflictor 714 determines the intersection 140 of the bounding box 124A and the bounding box 124B.

The deconflictor 714 determines vertex coordinates of the intersection 140 based on vertex coordinates of the bounding box 124A and the bounding box 124B. In an example, the deconflictor 714 determines the coordinates $(X_{ATL}, Y_{ATL})$ of the top-left vertex and the coordinates $(X_{ABR}, Y_{ABR})$ of the bottom-right vertex of the bounding box 124A, as described with reference to FIG. 6. Similarly, the deconflictor 714 determines coordinates $(X_{BTL}, Y_{BTL})$ of the top-left vertex and coordinates $(X_{BBR}, Y_{BBR})$ of the bottom-right vertex of the bounding box 124B.

The deconflictor 714 determines coordinates $(X_{ITL}, Y_{ITL})$ of a top-left vertex of the intersection 140 based on the coordinates $(X_{ATL}, Y_{ATL})$ of the top-left vertex of the bounding box 124A and the coordinates $(X_{BTL}, Y_{BTL})$ of the top-left vertex of the bounding box 124B (e.g., $X_{ITL}$=max $(X_{ATL}, X_{BTL})$, where max (a, b) corresponds to the higher of a or b, and $Y_{ITL}$=min $(Y_{ATL}, Y_{BTL})$, where min (a, b) corresponds to the lower of a or b).

The deconflictor 714 determines coordinates $(X_{IBR}, Y_{IBR})$ of a bottom-right vertex of the intersection 140 based on the coordinates $(X_{ABR}, Y_{ABR})$ of the bottom-right vertex of the bounding box 124A and the coordinates $(X_{BBR}, Y_{BBR})$ of the bottom-right vertex of the bounding box 124B (e.g., $X_{IBR}$=min $(X_{ABR}, X_{BBR})$, and $Y_{IBR}$=max $(Y_{ABR}, Y_{BBR})$). In a particular aspect, the intersection 140 is indicated by the top-left vertex coordinates $(X_{ITL}, Y_{ITL})$ and the bottom-right vertex coordinates $(X_{IBR}, Y_{IBR})$.

The deconflictor 714 determines a movement offset based on dimensions of the intersection 140 (e.g., as indicated by the coordinates). The movement offset includes a vertical movement offset 742, a horizontal movement offset 744, or both. In some implementations, the deconflictor 714 determines the vertical movement offset 742 based on a difference between a vertical coordinate of the top-left vertex of the intersection 140 and a vertical coordinate of the bottom-right vertex of the intersection 140 (e.g., the vertical movement offset 742=$Y_{ITL}$−$Y_{IBR}$). In some implementations, the deconflictor 714 determines the horizontal movement offset 744 based on a difference between a horizontal coordinate of the bottom-right vertex of the intersection 140 and a horizontal coordinate of the top-left vertex of the intersection 140 (e.g., the horizontal movement offset 744=$X_{IBR}$−$X_{ITL}$).

The deconflictor 714 applies a first portion of the movement offset to the label location 122A to determine a candidate label location 126A of the label 112A, a second portion of the movement offset to the label location 122B to determine a candidate label location 126B of the label 112B, or both. In some implementations, the first portion, the second portion, or both, are based on relative priorities associated with the label type 452A of the label 112A and the label type 452B of the label 112B. For example, the first portion is higher than the second portion if a first priority of the label type 452A is lower than a second priority of the label type 452B.

A candidate bounding box 724A of the label 112A is at the candidate label location 126A and has the same dimensions as the bounding box 124A. A candidate bounding box 724B of the label 112B is at the candidate label location 126B and has the same dimensions as the bounding box 124B. The candidate bounding box 724A does not overlap the candidate bounding box 724B.

In an example 732A, the movement offset includes the vertical movement offset 742 and the horizontal movement offset 744. In an example 732B, the movement offset includes the vertical movement offset 742 and does not include the horizontal movement offset 744. In an example 732C, the movement offset includes the horizontal movement offset 744 and does not include the vertical movement offset 742. In each of the example 732A, the example 732B, and the example 732C, the deconflictor 714 applies half of the movement offset to the label location 122A to determine the candidate label location 126A and half of the movement offset to the label location 122B to determine the candidate label location 126B.

In the example 732A, coordinates $(X_{ACL}, Y_{ACL})$ of the candidate label location 126A are based on coordinates $(X_{AL}, Y_{AL})$ of the label location 122A, half of the horizontal movement offset 744, and half of the vertical movement offset 742 (e.g., $X_{ACL}$=$X_{AL}$−0.5 (the horizontal movement offset 744), and $Y_{ACL}$=$Y_{AL}$+0.5 (the vertical movement offset 742)). Similarly, coordinates $(X_{BCL}, Y_{BCL})$ of the candidate label location 126B are based on coordinates $(X_{BL}, Y_{BL})$ of the label location 122B, half of the horizontal movement offset 744, and half of the vertical movement offset 742 (e.g., $X_{BCL}=X_{BL}+0.5$ (the horizontal movement offset 744), and $Y_{BCL}=Y_{BL}-0.5$ (the vertical movement offset 742)).

In the example 732B, coordinates ($X_{ACL}$, $Y_{ACL}$) of the candidate label location 126A are based on coordinates ($X_{AL}$, $Y_{AL}$) of the label location 122A and half of the vertical movement offset 742 (e.g., $X_{ACL}=X_{AL}$ and $Y_{ACL}=Y_{AL}+0.5$ (the vertical movement offset 742)). Similarly, coordinates ($X_{BCL}$, $Y_{BCL}$) of the candidate label location 126B are based on coordinates ($X_{BL}$, $Y_{BL}$) of the label location 122B and half of the vertical movement offset 742 (e.g., $X_{BCL}=X_{BL}$, and $Y_{BCL}=Y_{BL}-0.5$ (the vertical movement offset 742)).

In the example 732C, coordinates ($X_{ACL}$, $Y_{ACL}$) of the candidate label location 126A are based on coordinates ($X_{AL}$, $Y_{AL}$) of the label location 122A and half of the horizontal movement offset 744 (e.g., $X_{ACL}=X_{AL}-0.5$ (the horizontal movement offset 744), and $Y_{ACL}=Y_{AL}$). Similarly, coordinates ($X_{BCL}$, $Y_{BCL}$) of the candidate label location 126B are based on coordinates ($X_{BL}$, $Y_{BL}$) of the label location 122B and half of the horizontal movement offset 744 (e.g., $X_{BCL}=X_{BL}+0.5$ (the horizontal movement offset 744), and $Y_{BCL}=Y_{BL}$).

The example 732A, the example 732B, and the example 732C are provided as illustrative, non-limiting, examples of applying portions of movement offsets to the label location 122A and the label location 122B to determine the candidate label location 126A and the candidate label location 126B, respectively. In other examples, other types of movement offsets can be applied to the label location 122A, the label location 122B, or both.

In some implementations, the deconflictor 714 has a set of available movement offset combinations that can be performed. For example, a first movement offset combination includes a vertical movement offset 742 and a horizontal movement offset 744. A second movement offset combination includes the vertical movement offset 742 and not the horizontal movement offset 744. A third movement offset combination includes the horizontal movement offset 744 and not the vertical movement offset 742. The set of available movement offset combinations can include one or more of the first movement offset combination, the second movement offset combination, the third movement offset combination, or another type of movement offset combination. In a particular aspect, the deconflictor 714 selects one of the available movement offset combinations from the set to generate candidate label locations 126.

In a particular implementation, the deconflictor 714 initializes a set of remaining movement offset combinations to include each of the available movement offset combinations at a start of a label comparison iteration 706 comparing the first label 790 and the second label 792. The deconflictor 714, in response to receiving a request from the intra-layer conflict analyzer 226 (or the inter-layer conflict analyzer 228 as further described with reference to FIG. 8) to generate candidate label locations during the label comparison iteration 706, selects one of the movement offset combinations from the set of remaining offset movement combinations to generate the candidate label locations 126 and removes the selected movement offset combination from the set of remaining offset movement combinations. The deconflictor 714, in response to determining that the set of remaining movement combinations is empty, determines that all available candidate label locations for the first label 790 and the second label 792 have been previously generated.

In a particular implementation, the deconflictor 714 receives previously generated candidate label locations (e.g., the candidate label location 126A and the candidate label location 126B) of the first label 790 and the second label 792 from the intra-layer conflict analyzer 226 (or the inter-layer conflict analyzer 228 as further described with reference to FIG. 8) with an indication that at least one of the candidate label locations fails to satisfy a corresponding selection criterion. The deconflictor 714 determines the candidate bounding box 724A corresponding to the candidate label location 126A and the candidate bounding box 724B corresponding to the candidate label location 126B. The deconflictor 714 determines updated versions of the candidate label location 126A and the candidate label location 126B based on the candidate bounding box 724A and the candidate bounding box 724B. For example, the deconflictor 714 determines updated versions of the candidate label location 126A and the candidate label location 126B such that there is no conflict between corresponding updated versions of the candidate bounding box 724A and the candidate bounding box 724B.

Referring to FIG. 7D, a diagram 760 illustrates examples of operations performed by the selection criterion analyzer 716. The selection criterion analyzer 716 is configured to determine whether the candidate label location 126A satisfies a first selection criterion, the candidate label location 126B satisfies a second selection criterion, or both.

The selection criterion analyzer 716 determines, based on the candidate label location 126A, a candidate bounding box 724A of the label 112A. For example, the candidate bounding box 724A is at the candidate label location 126A and has the same dimensions (e.g., the width 642A, the height 644A, or both) as the bounding box 124A. Similarly, the selection criterion analyzer 716 determines, based on the candidate label location 126B, a candidate bounding box 724B of the label 112B. For example, the candidate bounding box 724B is at the candidate label location 126B and has the same dimensions (e.g., the width 642B, the height 644B, or both) as the bounding box 124B.

In a particular aspect, the selection criterion analyzer 716 determines that the candidate label location 126A satisfies the first selection criterion based at least in part on determining that the candidate label location 126A is greater than or equal to a first threshold distance from the map location 128A (or the map location symbol 622A), less than or equal to a second threshold distance from the map location 128A (or the map location symbol 622A), or both. In a particular aspect, the selection criterion analyzer 716 determines that the candidate label location 126A satisfies the first selection criterion based at least in part on determining that the candidate bounding box 724A is at least a first threshold distance from the map location 128A (or the map location symbol 622A), is within a second threshold distance from the map location 128A (or the map location symbol 622A), or both. One or more of the threshold distances are based on a user input, a configuration setting, default data, the zoom level 433 of FIG. 4, a corresponding label type 452, or a combination thereof.

Similarly, the selection criterion analyzer 716 determines that the candidate label location 126B satisfies the second selection criterion based at least in part on determining that the candidate label location 126B is greater than or equal to a first threshold distance from the map location 128B (or a second map location symbol of the label type 452B), less than or equal to a second threshold distance from the map location 128B (or the second map location symbol), or both. In a particular aspect, the selection criterion analyzer 716 determines that the candidate label location 126B satisfies the second selection criterion based at least in part on determining that the candidate bounding box 724B is at least a first threshold distance from the map location 128B (or the second map location symbol), is within a second threshold distance from the map location 128B (or the second map location symbol), or both.

In some implementations, the selection criterion analyzer 716 determines that the candidate label location 126A of the label 112A satisfies the first selection criterion based at least in part on determining that the candidate bounding box 724A does not overlap bounding boxes (e.g., as indicated by the layer bounding box data 223) of any of the other labels of the labels 313 of the layer 221. Similarly, the selection criterion analyzer 716 determines that the candidate label location 126B of the label 112B satisfies the second selection criterion based at least in part on determining that the candidate bounding box 724B does not overlap bounding boxes (e.g., as indicated by the layer bounding box data 223) of any of the other labels of the labels 313 of the layer 221.

An example 734A corresponds to the candidate label location 126A and the candidate label location 126B of the example 732A of FIG. 7B. An example 734B corresponds to the candidate label location 126A and the candidate label location 126B of the example 732B of FIG. 7B. An example 734C corresponds to the candidate label location 126A and the candidate label location 126B of the example 732C of FIG. 7C.

In each of the example 734A, the example 734B, and the example 734C, the selection criterion analyzer 716, in response to determining that the candidate bounding box 724A is at least a first threshold distance from the map location 128A and less than a second threshold distance from the map location 128A, determines that the candidate label location 126A satisfies the first selection criterion.

In each of the example 734A and the example 734B, the selection criterion analyzer 716, in response to determining that the candidate bounding box 724B is less than a first threshold distance from the map location 128B, determines that the candidate label location 126B fails to satisfy the second selection criterion. In the example 734C, the selection criterion analyzer 716, in response to determining that the candidate bounding box 724B is at least the first threshold distance from the map location 128B and is within a second threshold distance from the map location 128B, determines that the candidate label location 126B satisfies the second selection criterion.

In each of the example 734A, the example 734B, and the example 734C, the selection criterion analyzer 716 generates a criterion met indicator 720 indicating that the candidate label location 126A satisfies a corresponding selection criterion. In the each of the example 734A and the example 734B, the criterion met indicator 720 indicates that the candidate label location 126B fails to satisfy a corresponding selection criterion. In the example 734C, the criterion met indicator 720 indicates that the candidate label location 126B satisfies a corresponding selection criterion.

Figure 8:
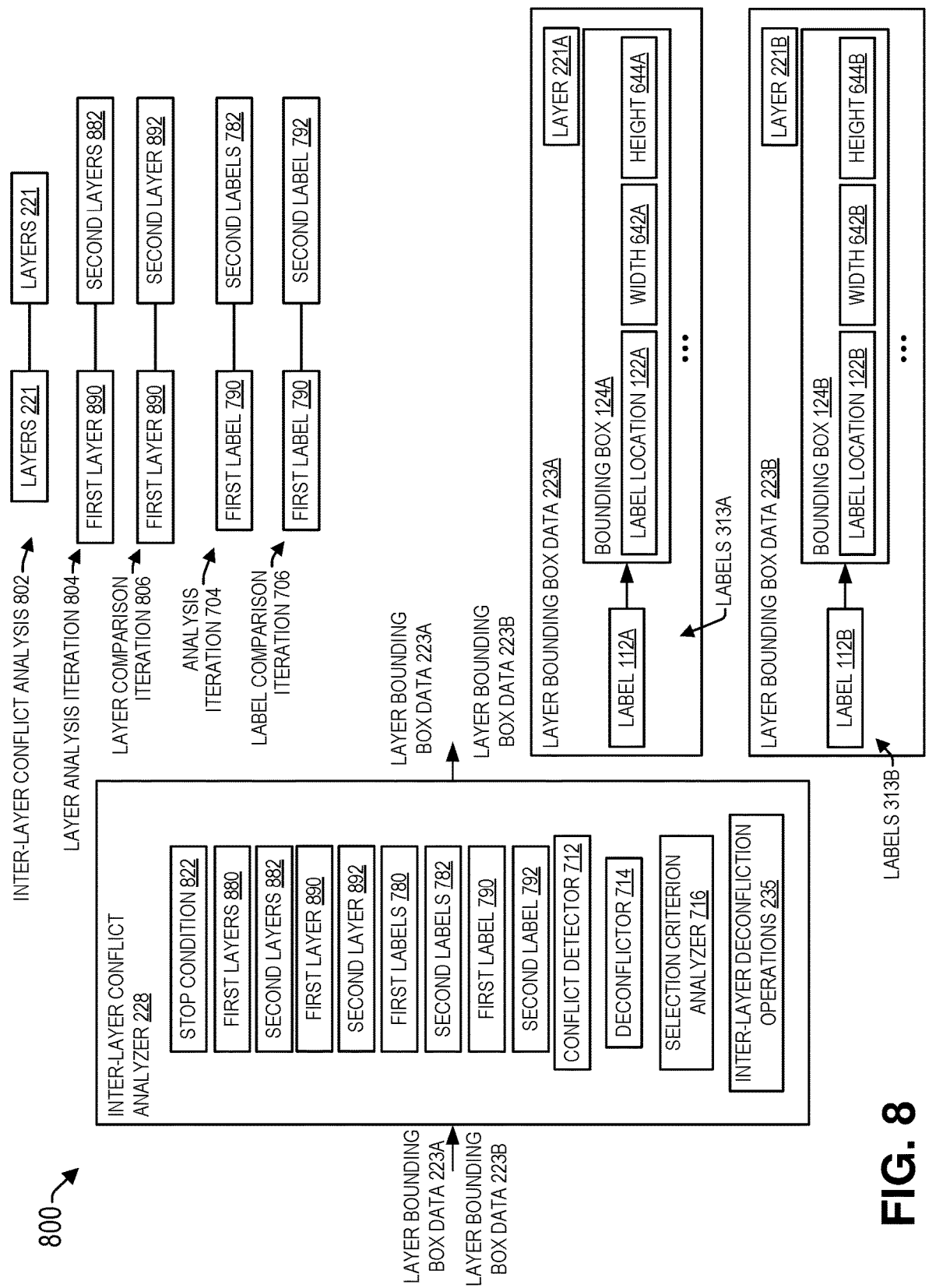
FIG. 8 is a diagram that illustrates examples of operations performed by an inter-layer conflict analyzer of the map generator of FIG. 1.

Referring to FIG. 8, a diagram 800 illustrates examples of operations performed by the inter-layer conflict analyzer 228. The inter-layer conflict analyzer 228 includes the conflict detector 712 coupled via the deconflictor 714 to the selection criterion analyzer 716.

In some implementations, the inter-layer conflict analyzer 228 includes copies of the conflict detector 712, the deconflictor 714, and the selection criterion analyzer 716 included in the intra-layer conflict analyzer 226. In alternative implementations, the intra-layer conflict analyzer 226 and the inter-layer conflict analyzer 228 share the conflict detector 712, the deconflictor 714, and the selection criterion analyzer 716.

The inter-layer conflict analyzer 228 is configured to perform inter-layer deconfliction operations 235 for the layers 221, such as the layer 221A and the layer 221B. For example, the inter-layer deconfliction operations 235 include one or more operations performed by the conflict detector 712, the deconflictor 714, the selection criterion analyzer 716, the inter-layer conflict analyzer 228, or a combination thereof.

In an example, layer bounding box data 223A of the layer 221A indicates that the layer 221A includes labels 313A. For example, the labels 313A include a label 112A, one or more additional labels 112, or a combination thereof. Similarly, layer bounding box data 223B of the layer 221B indicates that the layer 221B includes labels 313B. For example, the labels 313B include a label 112B, one or more additional labels 112, or a combination thereof.

The layer bounding box data 223A indicates dimensions and locations of bounding boxes of the labels 313A. For example, the layer bounding box data 223A indicates that the label 112A has a bounding box 124A, and that the bounding box 124A has a width 642A and a height 644A at a label location 122A. Similarly, the layer bounding box data 223B indicates dimensions and locations of bounding boxes of the labels 313B. For example, the layer bounding box data 223B indicates that the label 112B has a bounding box 124B, and that the bounding box 124B has a width 642B and a height 644B at a label location 122B.

The conflict detector 712 is configured to determine, based on the layer bounding box data 223A and the layer bounding box data 223B, whether a conflict exists between at least one of the labels 313A of the layer 221A and at least one of the labels 313B of the layer 221B, as described with reference to FIG. 7B. The deconflictor 714 is configured to generate candidate label locations of the at least one of the labels 313A and the at least one of the labels 313B to resolve the conflict, as described with reference to FIG. 7C. The selection criterion analyzer 716 is configured to determine whether a candidate label location satisfies a selection criterion, as further described with reference to FIG. 7D.

In a particular implementation, the inter-layer conflict analyzer 228, in response to receiving layer bounding box data 223 of the layers 221 from the intra-layer conflict analyzer 226 of FIG. 2, performs inter-layer conflict analysis 802 until a stop condition 822 is detected. In a particular aspect, the stop condition 822 includes detecting that a threshold count of iterations have been performed, detecting that a timer has expired, determining that no conflicts are detected between any of labels 313 of any of the layers 221 and labels 313 of any other of the layers 221, or a combination thereof.

In a particular aspect, the inter-layer conflict analysis 802 corresponds to a comparison of each of the labels 313 of each of the layers 221 with each of the labels 313 of others of the layers 221 to determine whether a conflict is detected. In a particular implementation, the inter-layer conflict analyzer 228 initializes first layers 880 to include the layers 221. The first layers 880 correspond to layers that are remaining for the inter-layer conflict analysis 802. The inter-layer conflict analyzer 228 performs one or more layer analysis iterations 804 during the inter-layer conflict analysis 802 to compare each of the layers 221 to others of the layers 221.

The inter-layer conflict analyzer 228, in response to determining that the first layers 880 include at least one layer, determines that a layer analysis iteration 804 is to be performed. During a layer analysis iteration 804, the inter-layer conflict analyzer 228 performs a conflict analysis of one of the first layers 880. As an example, the inter-layer conflict analyzer 228 removes a particular layer 221 (e.g., the layer 221A) from the first layers 880, and designates the particular layer 221 as a first layer 890. The first layer 890 corresponds to a layer that is being analyzed during the layer analysis iteration 804. The inter-layer conflict analyzer 228 initializes second layers 882 to include all of the layers 221 other than the first layer 890. The second layers 882 correspond to layers that are to be compared with the first layer 890 during the layer analysis iteration 804.

The inter-layer conflict analyzer 228 performs one or more layer comparison iterations 806 during the layer analysis iteration 804 to compare the first layer 890 to each of the second layers 882. During a layer comparison iteration 806, the inter-layer conflict analyzer 228 performs a comparison of the first layer 890 with one of the second layers 882. As an example, the inter-layer conflict analyzer 228 removes a particular layer 221 (e.g., the layer 221B) from the second layers 882, and designates the particular layer 221 as a second layer 892. The first layer 890 is compared to the second layer 892 during the layer comparison iteration 806.

The inter-layer conflict analyzer 228 performs one or more analysis iterations 704 during the layer comparison iteration 806 to compare each of the labels 313 of the first layer 890 to the labels 313 of the second layer 892. The inter-layer conflict analyzer 228 initializes first labels 780 to include the labels 313 of the first layer 890. In an example, the first layer 890 includes the layer 221A and the inter-layer conflict analyzer 228 initializes the first labels 780 with the labels 313A of the layer 221A. The first labels 780 correspond to labels that are remaining for analysis in the layer comparison iteration 806 of the first layer 890. The inter-layer conflict analyzer 228, in response to determining that the first labels 780 include at least one label, determines that an analysis iteration 704 is to be performed. During an analysis iteration 704, the inter-layer conflict analyzer 228 performs a conflict analysis of one of the first labels 780. As an example, the inter-layer conflict analyzer 228 removes a particular label 112 (e.g., the label 112A) from the first labels 780, and designates the particular label 112 as a first label 790. The first label 790 corresponds to a label that is being analyzed during the analysis iteration 704. The inter-layer conflict analyzer 228 initializes second labels 782 to include the labels 313 of the second layer 892. In an example, the second layer 892 includes the layer 221B and the inter-layer conflict analyzer 228 initializes the second labels 782 with the labels 313B of the layer 221B. The second labels 782 correspond to labels that are to be compared with the first label 790. The inter-layer conflict analyzer 228 thus initializes the second labels 782 with labels from another layer (e.g., the layer 221B) than the layer (e.g., the layer 221A) of the first label 790, as compared to the intra-layer conflict analyzer 226 initializing the second labels 782 with labels from the same layer as the layer of the first label 790.

The inter-layer conflict analyzer 228 performs one or more label comparison iterations 706 during the analysis iteration 704 to compare the first label 790 to the second labels 782, as described with reference to FIGS. 7A-7D. During a label comparison iteration 706, the inter-layer conflict analyzer 228 performs a comparison of the first label 790 with one of the second labels 782. As an example, the inter-layer conflict analyzer 228 removes a particular label 112 (e.g., the label 112B) from the second labels 782, and designates the particular label 112 as a second label 792. The inter-layer conflict analyzer 228 provides the first label 790 and the second label 792 to the conflict detector 712.

The conflict detector 712 performs a comparison of the first label 790 and the second label 792 based on the bounding box 124A (e.g., indicated by the layer bounding box data 223A) and the bounding box 124B (e.g., indicated by the layer bounding box data 223B), as described with reference to FIG. 7B. The inter-layer conflict analyzer 228, in response to determining that the conflict detector 712 indicates no conflict between the first label 790 and the second label 792, determines that the label comparison iteration 706 has ended successfully. Alternatively, the inter-layer conflict analyzer 228, in response to determining that the conflict detector 712 indicates a conflict between the first label 790 and the second label 792, provides the bounding boxes of the first label 790 and the second label 792 to the deconflictor 714.

The deconflictor 714 determines candidate label locations of the first label 790 and the second label 792 based on bounding boxes of the first label 790 and the second label 792, as described with reference to FIG. 7C. In a particular example, the first label 790 includes the label 112A and the second label 792 includes the label 112B. In this example, the deconflictor 714 determines the candidate label location 126A and the candidate label location 126B based on the bounding box 124A of the label 112A and the bounding box 124B of the label 112B.

The inter-layer conflict analyzer 228 provides candidate label locations (e.g., the candidate label location 126A and the candidate label location 126B) to the selection criterion analyzer 716. The selection criterion analyzer 716 determines whether each of the candidate label locations satisfies a corresponding selection criterion, as described with reference to FIG. 7D.

The inter-layer conflict analyzer 228, in response to determining that each of the candidate label locations (e.g., the candidate label location 126A and the candidate label location 126B) satisfies a corresponding selection criterion, determines that a label location of at least one of the first label 790 or the second label 792 is to be updated. For example, the inter-layer conflict analyzer 228, in response to determining that the label location 122A is distinct from the candidate label location 126A of the label 112A, updates the layer bounding box data 223A to set the label location 122A of the bounding box 124A to indicate the candidate label location 126A, and resets the second labels 782 to include the labels 313B. To illustrate, since the first label 790 (e.g., the label 112A) has moved, the second labels 782 are reset so that subsequent label comparison iterations also include any of the labels 313B to which the first label 790 has already been compared. In some implementations, the inter-layer conflict analyzer 228, responsive to updating the layer bounding box data 223A, resets the second layers 882 to include all of the layers 221 other than the first layer 890 (e.g., the layer 221A). To illustrate, since a label (e.g., the label 112A) of the layer 221A has moved, the second layers 882 are reset so that subsequent layer comparison iterations also include any of the layers 221 to which the first layer 890 has already been compared. As another example, the inter-layer conflict analyzer 228, in response to determining that the label location 122B is distinct from the candidate label location 126B of the label 112B, updates the layer bounding box data 223B to set the label location 122B to indicate the candidate label location 126B, and if the layer 221B is not included in the first layers 880, adds the layer 221B to the first layers 880. To illustrate, since a label (e.g., the label 112B) of the layer 221B has moved, if a layer analysis iteration of the layer 221B has already been performed, the layer 221B is added back to the first layers 880 so that a layer analysis iteration of the layer 221B can be performed again.

The inter-layer conflict analyzer 228, in response to determining that each of the candidate label locations (e.g., the candidate label location 126A and the candidate label location 126B) satisfies a corresponding selection criterion, determines that the label comparison iteration 706 has ended.

In some implementations, the inter-layer conflict analyzer 228, in response to determining that at least one of the candidate label locations (e.g., the candidate label location 126A, the candidate label location 126B, or both) fails to satisfy a corresponding selection criterion, uses the deconflictor 714, the selection criterion analyzer 716, or both, to process the first label 790 and the second label 792 again. For example, the inter-layer conflict analyzer 228 provides the bounding boxes of the first label 790 and the second label 792 to the deconflictor 714. In some examples, the inter-layer conflict analyzer 228 provides the candidate label locations of the first label 790 and the second label 792 to the deconflictor 714.

In a particular aspect, the deconflictor 714 generates an output indicating that all available candidate label locations for the first label 790, the second label 792, or both, have been previously generated during the label comparison iteration 706. The inter-layer conflict analyzer 228, in response to receiving the output from the deconflictor 714, determines that the label comparison iteration 706 has ended unsuccessfully. Alternatively, the deconflictor 714 generates an updated version of the candidate label locations, as described with reference to FIG. 7C, and the inter-layer conflict analyzer 228 provides the updated candidate label locations to the selection criterion analyzer 716. The label comparison iteration 706 continues with the selection criterion analyzer 716 determining whether each of the updated candidate label locations satisfies the corresponding selection criterion.

In some implementations, the inter-layer conflict analyzer 228, in response to determining that one (e.g., the candidate label location 126A) of the candidate label locations satisfies a first selection criterion and that the other (e.g., the candidate label location 126B) of the candidate label locations fails to satisfy a second selection criterion, generates an updated version of the candidate label location 126B based on the candidate label location 126A and the candidate label location 126B, and provides the updated version of the candidate label location 126B to the selection criterion analyzer 716. In these implementations, the inter-layer conflict analyzer 228 refrains from generating an updated version of the candidate label location 126A in response to determining that the candidate label location 126A satisfies the first selection criterion. The label comparison iteration 706 continues with the selection criterion analyzer 716 determining whether the updated candidate label location satisfies the corresponding selection criterion.

In some implementations, the inter-layer conflict analyzer 228, in response to determining that the label comparison iteration 706 has ended unsuccessfully, refrains from updating the label locations of the first label 790 (e.g., the label 112A) and the second label 792 (e.g., the label 112B). In these implementations, the inter-layer conflict analyzer 228 generates a notification indicating a conflict between the label 112A of the layer 221A at the label location 122A and the label 112B of the layer 221B at the label location 122B.

In some implementations, the inter-layer conflict analyzer 228, in response to determining that the label comparison iteration 706 has ended unsuccessfully, sets the label locations of the first label 790 and the second label 792 to the candidate label locations, and generates a notification indicating that a corresponding selection criterion is not satisfied. For example, the inter-layer conflict analyzer 228, in response to determining that the candidate label location 126A is distinct from the label location 122A, updates the layer bounding box data 223A to set the label location 122A of the bounding box 124A to indicate the candidate label location 126A and resets the second labels 782 to include the labels 313B. In some implementations, the inter-layer conflict analyzer 228, responsive to updating the layer bounding box data 223A, resets the second layers 882 to include all of the layers 221 other than the first layer 890 (e.g., the layer 221A). As another example, the inter-layer conflict analyzer 228, in response to determining that the candidate label location 126B is distinct from the label location 122B, updates the layer bounding box data 223B to set the label location 122B to indicate the candidate label location 126B, and if the layer 221B is not included in the first layers 880, adds the layer 221B to the first layers 880.

The inter-layer conflict analyzer 228 generates a notification indicating that the label 112B at the candidate label location 126B fails to satisfy the second selection criterion. In a particular aspect, the inter-layer conflict analyzer 228 adds the notification (e.g., of a detected conflict or failure to satisfy a selection criterion) to the layer bounding box data 223B. The inter-layer conflict analyzer 228, when generating the map 119 (or map data), includes the notification in the map 119, the map data, an alert, or a combination thereof.

In some implementations, the inter-layer conflict analyzer 228, in response to determining that the label comparison iteration 706 has ended, determines whether the stop condition 822 is detected. In a particular aspect, the inter-layer conflict analyzer 228, in response to determining that the label comparison iteration 706 has ended and that the stop condition 822 is not detected, determines whether another label comparison iteration 706 is to be performed with the first label 790. For example, the inter-layer conflict analyzer 228, in response to determining that the second labels 782 include at least one label to be compared to the first label 790, initiates another label comparison iteration 706. To illustrate, the inter-layer conflict analyzer 228 removes a particular label 112 from the second labels 782 and designates the particular label 112 as the second label 792. The inter-layer conflict analyzer 228 provides the first label 790 and the second label 792 to the conflict detector 712. Alternatively, the inter-layer conflict analyzer 228, in response to determining that there are no labels in the second labels 782, determines that the analysis iteration 704 has ended.

In some implementations, the inter-layer conflict analyzer 228, in response to determining that the analysis iteration 704 has ended, determines whether the stop condition 822 is detected. In a particular aspect, the inter-layer conflict analyzer 228, in response to determining that the analysis iteration 704 has ended and that the stop condition 822 is not detected, determines whether another analysis iteration 704 is to be performed with another label selected as the first label 790. For example, the inter-layer conflict analyzer 228, in response to determining that the first labels 780 include at least one label to be analyzed, initiates another analysis iteration 704. To illustrate, the inter-layer conflict analyzer 228 removes a particular label 112 from the first labels 780 and designates the particular label 112 as the first label 790. The inter-layer conflict analyzer 228 initializes the second labels 782 with the labels 313 of the second layer 892. To illustrate, the first label 790 corresponds to another label of the first layer 890 (e.g., the layer 221A) and the second labels 782 correspond to the labels 313 of the second layer 892 (e.g., the layer 221B). The inter-layer conflict analyzer 228 performs one or more label comparison iterations 706 to compare the first label 790 to the second labels 782.

The inter-layer conflict analyzer 228, in response to determining that there are no labels in the first labels 780, determines that the layer comparison iteration 806 (e.g., comparing the first layer 890 to the second layer 892) has ended. The inter-layer conflict analyzer 228, in response to determining that the layer comparison iteration 806 has ended, determines whether the stop condition 822 is detected. In a particular aspect, the inter-layer conflict analyzer 228, in response to determining that the layer comparison iteration 806 has ended and that the stop condition 822 is not detected, determines whether another layer comparison iteration 806 is to be performed with the first layer 890. For example, the inter-layer conflict analyzer 228, in response to determining that the second layers 882 include at least one layer to be compared to the first layer 890, initiates another layer comparison iteration 806. To illustrate, the inter-layer conflict analyzer 228 removes a particular layer 221 from the second layers 882 and designates the particular layer 221 as the second layer 892, and performs a comparison of the first layer 890 and the second layer 892. Alternatively, the inter-layer conflict analyzer 228, in response to determining that there are no layers in the second layers 882, determines that the layer analysis iteration 804 (e.g., comparing the first layer 890 with the second layers 882) has ended.

In some implementations, the inter-layer conflict analyzer 228, in response to determining that the layer analysis iteration 804 has ended, determines whether the stop condition 822 is detected. The inter-layer conflict analyzer 228, in response to determining that the layer analysis iteration 804 has ended and that the stop condition 822 is not detected, determines whether another layer analysis iteration 804 is to be performed with another layer as the first layer 890. For example, the inter-layer conflict analyzer 228, in response to determining that the first layers 880 include at least one layer to be analyzed, initiates another layer analysis iteration 804. To illustrate, the inter-layer conflict analyzer 228 removes a particular layer 221 (e.g., the layer 221B) from the first layers 880 and designates the particular layer 221 as the first layer 890. The inter-layer conflict analyzer 228 initializes the second layers 882 to include all of the layers 221 other than the first layer 890. The inter-layer conflict analyzer 228 performs one or more layer comparison iterations 806 to compare the first layer 890 to each of the second layers 882. Alternatively, the inter-layer conflict analyzer 228, in response to determining that there are no layers in the first layers 880, determines that the stop condition 822 is detected.

In a particular aspect, detecting the stop condition 822 includes detecting that at least a threshold count of label comparison iterations 706 have been performed, detecting that at least a threshold count of analysis iterations 704 have been performed, detecting that at least a threshold count of layer comparison iterations 806 have been performed, detecting that at least a threshold count of layer analysis iterations 804 have been performed, determining that no conflicts are detected between any of labels 313 of any of the layers 221 and labels 313 of any other of the layers 221, determining that there are no layers in the first layers 880, detecting that a timer has expired, or a combination thereof.

The inter-layer conflict analyzer 228, in response to determining that the stop condition 822 is detected, determines that the inter-layer conflict analysis 802 of the layers 221 has ended and generates (e.g., renders) the map 119, map data, an alert, or a combination thereof based on the layer bounding box data 223 of the layers 221. In an example, the map 119 includes the label 112A at the label location 122A indicated by the layer bounding box data 223, the label 112B at the label location 122B indicated by the layer bounding box data 223, one or more additional labels 112 at label locations 122 indicated by the layer bounding box data 223, one or more notifications, or a combination thereof.

In a particular example, the map 119 is generated based on the label display data 335. For example, the map generator 104 generates the map 119 to display the label 112A based on the font type 610A, the font size 612A, the buffer 614A, the text alignment 616A, the text filter 620A, or a combination thereof. As another example, the map generator 104 generates the map 119 to display the map location symbol 622A at the map location 128A.

In some examples, the label location 122A indicated by the layer bounding box data 223 corresponds to the label location 122A generated by the label location generator 314. For example, the label location 122A has not been updated by the intra-layer conflict analyzer 226 or the inter-layer conflict analyzer 228. In some examples, the label location 122A indicated by the layer bounding box data 223 corresponds to the candidate label location 126A generated by the intra-layer conflict analyzer 226. For example, the label location 122A has been updated by the intra-layer conflict analyzer 226 to resolve an intra-layer conflict. In some examples, the label location 122A indicated by the layer bounding box data 223 corresponds to the candidate label location 126A generated by the inter-layer conflict analyzer 228. For example, the label location 122A has been updated by the inter-layer conflict analyzer 228 to resolve an inter-layer conflict.

In a particular aspect, the inter-layer conflict analyzer 228 provides the map 119, the map data, an alert (e.g., including a notification), or a combination thereof, to another component or device (e.g., a display device, a user device, a network device, etc.).

A technical advantage of the inter-layer conflict analyzer 228 resolving the conflicts prior to generating (e.g., rendering) the map 119 can include using less time and fewer computing resources as compared to moving labels in a rendered map. With conflicts resolved prior to rendering, the map 119 can be rendered with resolved conflicts faster and aid navigation in time-critical situations.

Figure 9A:
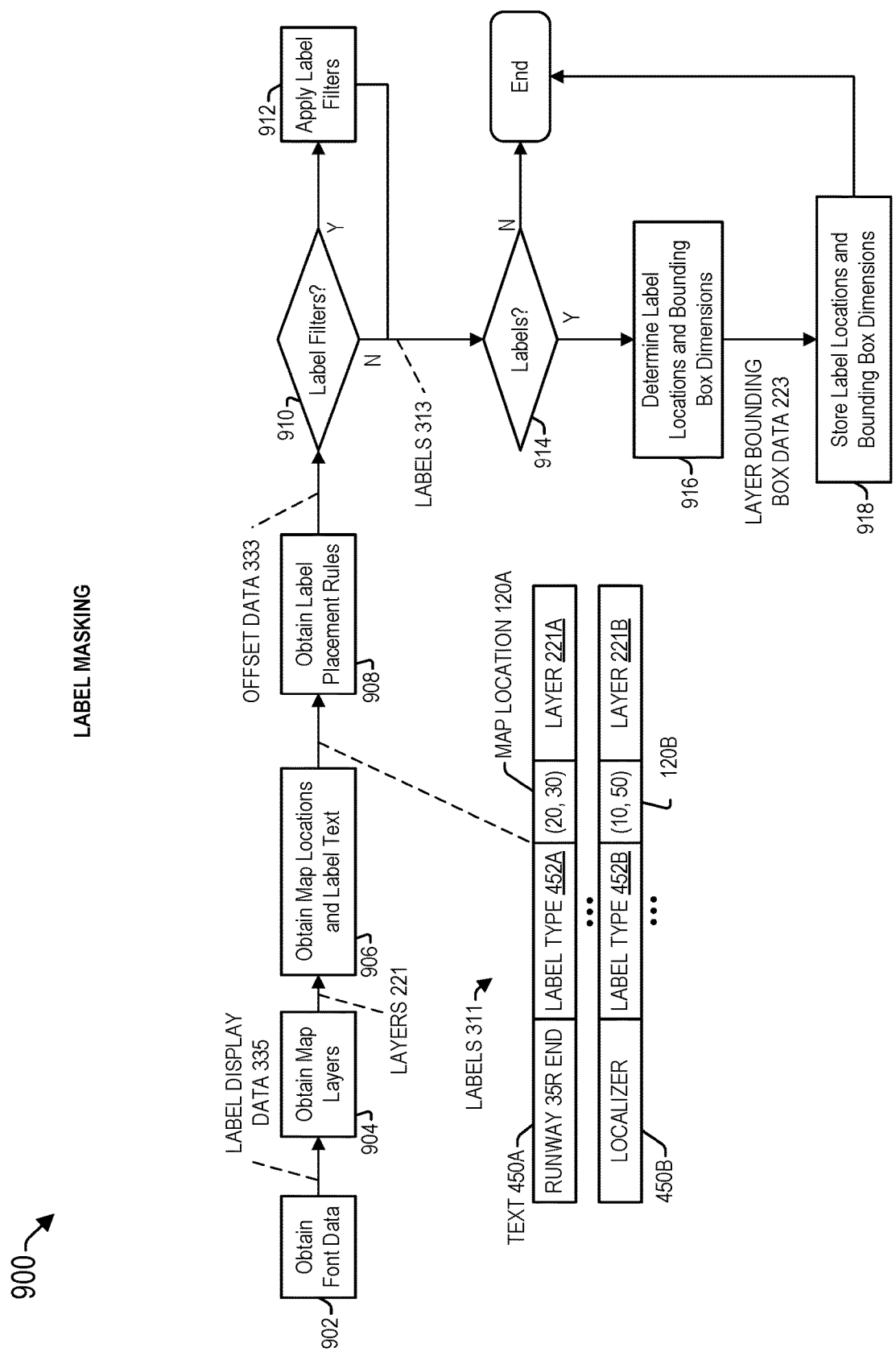
FIG. 9A is a diagram that illustrates a flow chart of an example of a method of determining bounding boxes of map labels.

Referring to FIG. 9A, an example is shown of a method 900 of determining bounding boxes of map labels. In a particular aspect, one or more operations of the method 900 are performed by the map generator 104 of FIG. 1, the layer bounding box generator 222, the one or more processors 290, the device 202, the system 200 of FIG. 2, the label selector 312, the label location generator 314, the bounding box generator 316 of FIG. 3, or a combination thereof.

For example, at 902, the bounding box generator 316 obtains font data, such as the label display data 335, as described with reference to FIG. 6. The label display data 335 indicates the font type 610, the font size 612, or both, associated with label types 452.

At 904, the map generator 104 obtains the layers 221 (e.g., map layers) that are to be included in the map 119, as described with reference to FIG. 2. At 906, the label selector 312 obtains map locations and label text. For example, the label selector 312 obtains the labels 311 of each of the layers 221, as described with reference to FIG. 3. The labels 311 include a plurality of labels 112. Each label 112 identifies a map location 128 and text 450, as described with reference to FIG. 4.

At 908, the label location generator 314 obtains label placement rules. For example, the label location generator 314 obtains the offset data 333 indicating a direction offset 554, a distance offset 556, or both, corresponding to a placement rule for a label type 452.

At 910, the label selector 312 determines whether there are any label filters (e.g., a label selection criterion 204) and, in response to determining that there are one or more label filters, applies the label filters, at 912. For example, the label selector 312, in response to receiving the label selection criterion 204, applies the label selection criterion 204 to the labels 311 to select the labels 313 of each of the layers 221.

At 914, the bounding box generator 316, determines whether there are any labels 313 to be included in the map 119 and, in response to determining that there is at least one label 313 to be included in the map 119, determines layer bounding box data 223 indicating label locations and bounding box dimensions, at 916, as further described with reference to FIG. 9B. At 918, the map generator 104 stores the label locations and bounding box dimensions as the layer bounding box data 223 in the memory 292, another device, or both.

Figure 9B:
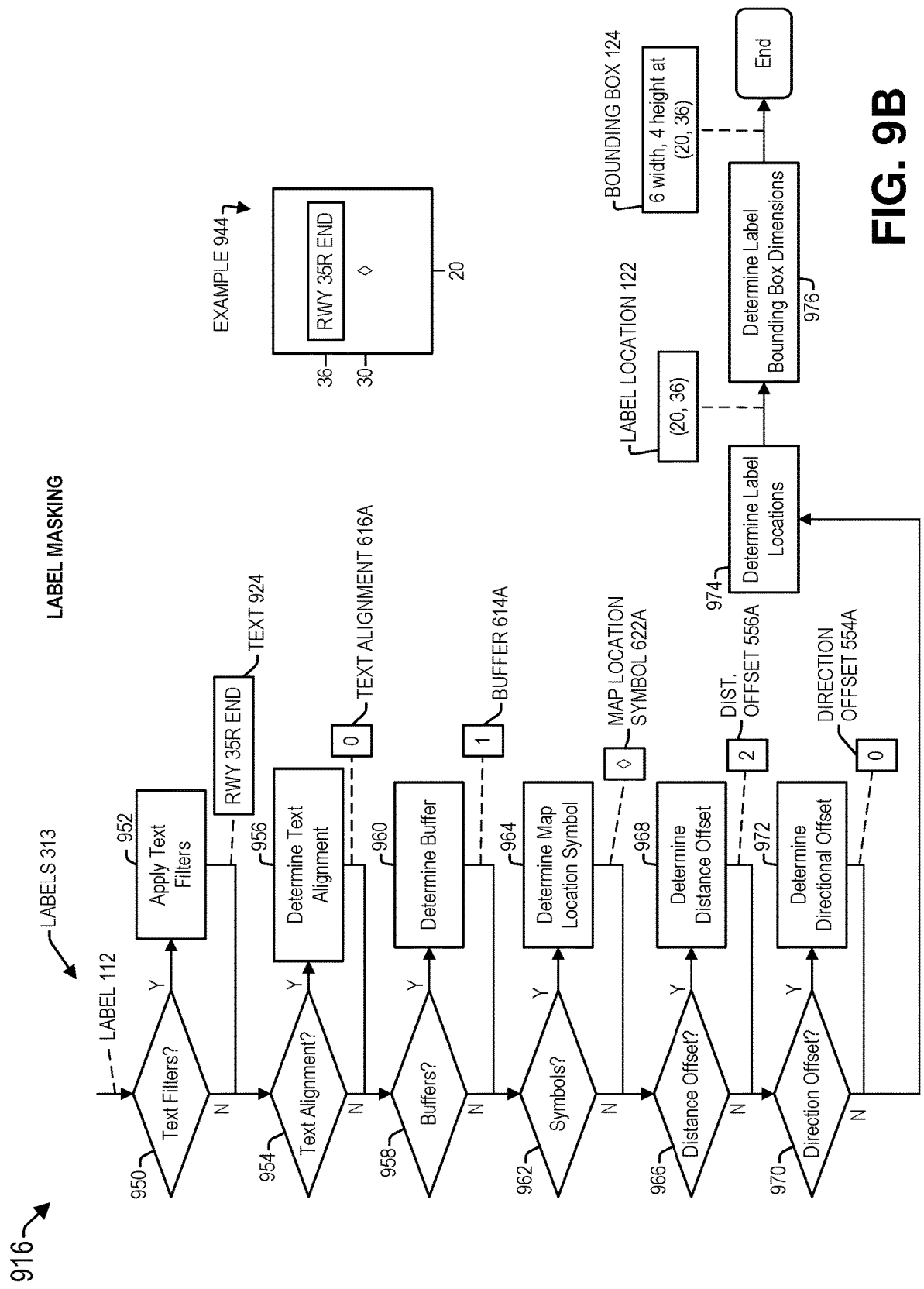
FIG. 9B is a diagram that illustrates a flow chart of another example of a method of determining bounding boxes of map labels.

Referring to FIG. 9B, an example is shown of a method 916 of determining bounding boxes of map labels. In a particular aspect, one or more operations of the method 900 are performed by the map generator 104 of FIG. 1, the layer bounding box generator 222, the one or more processors 290, the device 202, the system 200 of FIG. 2, the label location generator 314, the bounding box generator 316 of FIG. 3, or a combination thereof.

For example, at 950, the bounding box generator 316 determines whether any text filters are to be applied and if any text filters are to be applied, applies the text filters, at 952. To illustrate, the bounding box generator 316, in response to determining that a label 112A of the labels 313 has a label type 452A and that the label type 452A is associated with a text filter 620A, applies the text filter 620A (e.g., replace "RUNWAY" to "RWY") to the text 450A (e.g., "RUNWAY 35R END") to generate text 924 (e.g., "RWY 35R END") to be displayed for the label 112A, as described with reference to FIG. 6. In an example 944, the text 924 is displayed for the label 112A in the map 119.

At 954, the bounding box generator 316 determines whether any text alignment is to be applied and if any text alignment is to be applied, determines the text alignment, at 956. For example, the bounding box generator 316, in response to determining that the label type 452A is associated with a text alignment 616A (e.g., 0 degrees or horizontal alignment), determines that the text alignment 616A is to be applied to the text 924 when the map 119 is generated. In the example 944, the text 924 is displayed for the label 112A with the text alignment 616A (e.g., parallel to a horizontal axis) in the map 119.

At 958, the bounding box generator 316 determines whether any buffers are to be applied and if any buffers are to be applied, determines the buffer, at 960. For example, the bounding box generator 316, in response to determining that the label type 452A is associated with the buffer 614A (e.g., 1), determines that the buffer 614A is to be applied to the text 924 when the map 119 is generated. In the example 944, the text 924 is displayed for the label 112A with the buffer 614A (e.g., space all around) in the map 119.

At 962, the bounding box generator 316 determines whether any map location symbols are to be used, and in response to determining that map location symbols are to be used, determines the map location symbols, at 964. For example, the bounding box generator 316, in response to determining that the label type 452A is associated with the map location symbol 622A (e.g., 0), determines that the map location symbol 622A is to be displayed at the map location 128A when the map 119 is generated. In the example 944, the map location symbol 622A (e.g., 0) is displayed at the map location 128A in the map 119.

At 966, the label location generator 314 determines whether any distance offset is to be applied to the labels and if any distance offset is to be applied, determines the distance offset, at 968. For example, the label location generator 314, in response to determining that the label type 452A is associated with the distance offset 556A, determines that the text 924 is to be displayed at the distance offset 556A (e.g., 2) relative to the map location 128A when the map 119 is generated. In the example 944, the distance offset 556A (e.g., 2) indicates a Cartesian distance between the label location 122A and the map location 128A.

At 970, the label location generator 314 determines whether any direction offset is to be applied to the labels and if any direction offset is to be applied, determines the direction offset, at 972. For example, the label location generator 314, in response to determining that the label type 452A is associated with the direction offset 554A, determines that the text 924 is to be displayed at the direction offset 554A (e.g., 0) relative to the map location 128A (or the map location symbol 622A) when the map 119 is generated. In the example 944, the direction offset 554A (e.g., 0) indicates that the label location 122A is at a particular direction (e.g., 0 degrees or North) relative to the map location 128A (or the map location symbol 622A).

At 974, the label location generator 314 determines label locations. For example, the label location generator 314 applies the direction offset 554A and the distance offset 556A to the map location 128A (or the map location symbol 622A) to determine the label location 122A, as described with reference to FIG. 5.

At 976, the bounding box generator 316 determines label bounding box dimensions. For example, the bounding box generator 316 determines the width 642A and the height 644A of the bounding box 124A based on the display settings 635A, as described with reference to FIG. 6.

Figure 10:
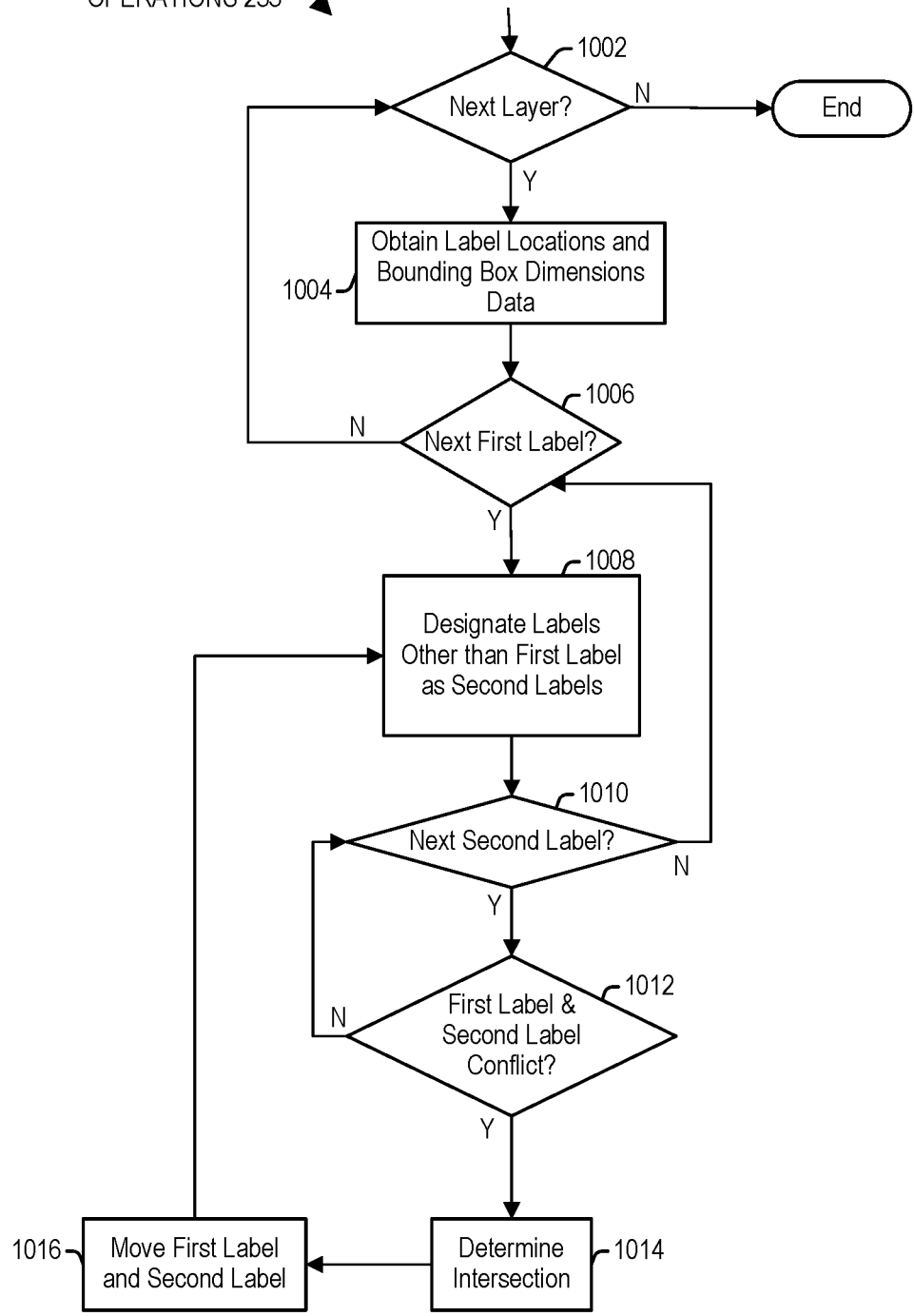
FIG. 10 is a diagram that illustrates a flow chart of an example of a method of intra-layer deconfliction operations.

Referring to FIG. 10, an example is shown of a method of the intra-layer deconfliction operations 233. In a particular aspect, one or more of the intra-layer deconfliction operations 233 are performed by the map generator 104 of FIG. 1, the intra-layer conflict analyzer 226, the one or more processors 290, the device 202, the system 200 of FIG. 2, or a combination thereof.

For example, at 1002, the map generator 104 determines whether another one of the layers 221 remains to be processed by the intra-layer conflict analyzer 226. The map generator 104, in response to determining that none of the layers 221 remain to be processed by the intra-layer conflict analyzer 226, determines that the intra-layer deconfliction operations 233 have ended. Alternatively, the map generator 104, in response to determining that another one of the layers 221 remains to be processed by the intra-layer conflict analyzer 226, obtains label locations and bounding box dimensions data, at 1004. For example, the map generator 104, in response to determining that a layer 221A remains to be processed by the intra-layer conflict analyzer 226, provides the layer 221A to the layer bounding box generator 222 to generate the layer bounding box data 223A, as described with reference to FIGS. 2-6. Layer bounding box data 223 indicates bounding box dimensions (e.g., a width 642 and a height 644) of each label 112 of the labels 313 of a layer 221 and indicates a label location 122. The intra-layer conflict analyzer 226 initializes the first labels 780 to include the labels 313 of the layer 221A.

At 1006, the intra-layer conflict analyzer 226 of FIG. 2 determines whether the first labels 780 include at least one label, as described with reference to FIG. 7A. The intra-layer conflict analyzer 226, in response to determining that there are no labels in the first labels 780, determines whether another one of the layers 221 remains to be processed by the intra-layer conflict analyzer 226, at 1002.

The intra-layer conflict analyzer 226, in response to determining that the first labels 780 include at least one label, initiates an analysis iteration 704, as described with reference to FIG. 7A. For example, at 1008, the intra-layer conflict analyzer 226 designates one of the first labels 780 as the first label 790, removes the first label 790 from the first labels 780, and designates all of the labels 313 other than the first label 790 as the second labels 782, as described with reference to FIG. 7A. At 1010, the intra-layer conflict analyzer 226 determines whether the second labels 782 include at least one label, as described with reference to FIG. 7A. The intra-layer conflict analyzer 226, in response to determining that there are no labels in the second labels 782, determines that the analysis iteration 704 has ended and, at 1006, determines whether the first labels 780 include at least one label to initiate a next analysis iteration.

Alternatively, the intra-layer conflict analyzer 226, in response to determining that the second labels 782 include at least one label, initiates a label comparison iteration 706, as described with reference to FIG. 7A. For example, the intra-layer conflict analyzer 226 selects one of the second labels 782 as the second label 792, and the conflict detector 712 determines, at 1012, whether the first label 790 conflicts with the second label 792, as described with reference to FIG. 7B.

The intra-layer conflict analyzer 226, in response to determining that no conflict is detected between the first label 790 and the second label 792, determines that the label comparison iteration 706 has ended successfully, as described with reference to FIG. 7A, and, at 1010, determines whether the second labels 782 include at least one label to initiate a next label comparison iteration.

Alternatively, at 1014, the intra-layer conflict analyzer 226, in response to determining that the first label 790 conflicts with the second label 792, determines an intersection between the first label 790 and the second label 792. For example, the intra-layer conflict analyzer 226, in response to determining that the conflict detector 712 detected a conflict between the first label 790 and the second label 792, provides bounding boxes of the first label 790 and the second label 792 to the deconflictor 714, as described with reference to FIG. 7A. The deconflictor 714 determines the intersection 140 between the first label 790 and the second label 792, as described with reference to FIG. 7C.

At 1016, the intra-layer conflict analyzer 226 moves the first label 790, the second label 792, or both. For example, the deconflictor 714 generates candidate label locations of the first label 790 and the second label 792 based on the intersection 140, as described with reference to FIG. 7C. The selection criterion analyzer 716 determines whether each of the candidate label locations satisfies a corresponding selection criterion, as described with reference to FIG. 7D. The intra-layer conflict analyzer 226 updates the layer bounding box data 223 to designate a candidate label location as a label location based at least in part on the candidate label location satisfying the selection criterion, as described with reference to FIG. 7A. At 1008, the intra-layer conflict analyzer 226, responsive to moving the first label 790, resets the second labels 782 to include all of the labels 313 other than the first label 790, as described with reference to FIG. 7A.

Figure 11:
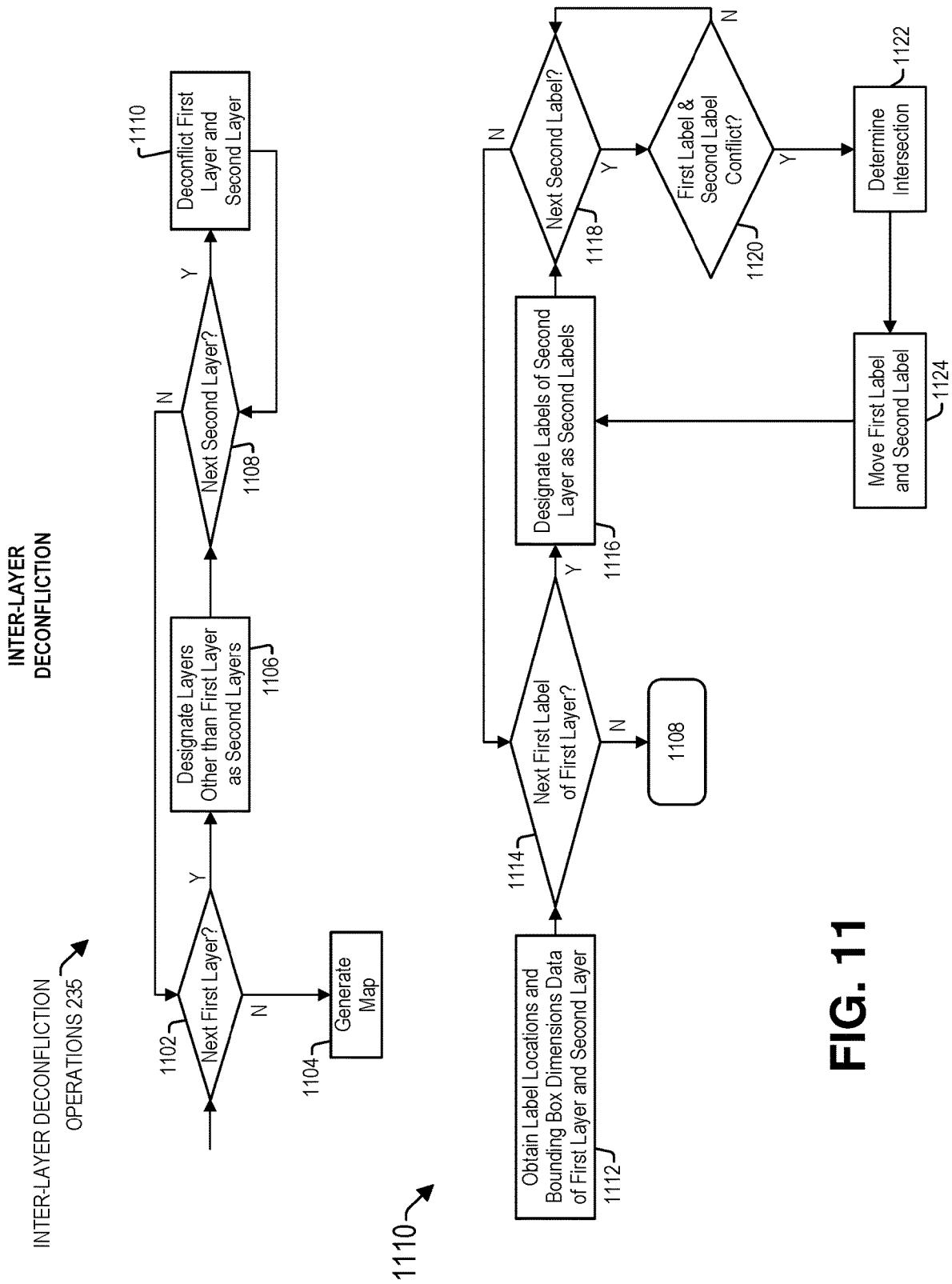
FIG. 11 is a diagram that illustrates a flow chart of an example of a method of inter-layer deconfliction operations.

Referring to FIG. 11, an example is shown of a method of the inter-layer deconfliction operations 235. In a particular aspect, one or more of the inter-layer deconfliction operations 235 are performed by the map generator 104 of FIG. 1, the inter-layer conflict analyzer 228, the one or more processors 290, the device 202, the system 200 of FIG. 2, or a combination thereof.

The inter-layer conflict analyzer 228 initializes the first layers 880 to include the layers 221. At 1102, the inter-layer conflict analyzer 228 of FIG. 2 determines whether the first layers 880 include at least one layer, as described with reference to FIG. 8. At 1104, the inter-layer conflict analyzer 228, in response to determining that there are no layers in the first layers 880 and that the layer bounding box data 223 of the layers 221 includes at least one bounding box, generates the map 119, map data, an alert, or a combination thereof, based on the layer bounding box data 223. Alternatively, the inter-layer conflict analyzer 228, in response to determining that there are no layers in the first layers 880 and that there are no bounding boxes indicated in the layer bounding box data 223 of the layers 221, generates an output indicating that no map is generated.

The inter-layer conflict analyzer 228, in response to determining that the first layers 880 include at least one layer, initiates a layer analysis iteration 804, as described with reference to FIG. 8. For example, at 1106, the inter-layer conflict analyzer 228 designates one of the first layers 880 as the first layer 890, removes the first layer 890 from the first layers 880, and designates the layers 221 other than the first layer 890 as the second layers 882, as described with reference to FIG. 8.

At 1108, the inter-layer conflict analyzer 228 determines whether the second layers 882 include at least one layer, as described with reference to FIG. 8. The inter-layer conflict analyzer 228, in response to determining that the second layers 882 include at least one layer, initiates a layer comparison iteration 806, as described with reference to FIG. 8. For example, at 1110, the inter-layer conflict analyzer 228 designates one of the second layers 882 as the second layer 892, removes the second layer 892 from the second layers 882, and performs a deconfliction of the first layer 890 and the second layer 892.

At 1108, the inter-layer conflict analyzer 228 determines whether the second layers 882 include at least one layer, as described with reference to FIG. 8. The inter-layer conflict analyzer 228, in response to determining that the second layers 882 do not include any layers, determines whether the first layers 880 include any layers, at 1102.

In FIG. 11, an example is shown of a method of operations included, at 1110. The inter-layer conflict analyzer 228 obtains label locations and bounding box dimensions data of first layer and second layer. For example, the inter-layer conflict analyzer 228 obtains the layer bounding box data 223A of the layer 221A and the layer bounding box data 223B of the layer 221B, as described with reference to FIG. 8. The inter-layer conflict analyzer 228 initializes the first labels 780 to include the labels 313A of the layer 221A.

At 1114, the inter-layer conflict analyzer 228 determines whether the first labels 780 include at least one label. The inter-layer conflict analyzer 228, in response to determining that the first labels 780 do not include any labels, determines that the layer comparison iteration 806 has ended and determines whether the second layers 882 include at least one layer, at 1108. Alternatively, the inter-layer conflict analyzer 228, in response to determining that the first labels 780 include at least one label, initiates an analysis iteration 704, as described with reference to FIG. 8. For example, at 1116, the inter-layer conflict analyzer 228 designates one of the first labels 780 as the first label 790 and designates the labels 313B of the layer 221B as the second labels 782, as described with reference to FIG. 8. At 1118, the inter-layer conflict analyzer 228 determines whether the second labels 782 include at least one label, as described with reference to FIG. 8. The inter-layer conflict analyzer 228, in response to determining that there are no labels in the second labels 782, determines that the analysis iteration 704 has ended and, at 1114, determines whether the first labels 780 include at least one label to initiate a next analysis iteration.

Alternatively, the inter-layer conflict analyzer 228, in response to determining that the second labels 782 include at least one label, initiates a label comparison iteration 706, as described with reference to FIG. 8. For example, the inter-layer conflict analyzer 228 selects one of the second labels 782 as the second label 792, and the conflict detector 712 determines, at 1120, whether the first label 790 conflicts with the second label 792, as described with reference to FIG. 8.

The inter-layer conflict analyzer 228, in response to determining that no conflict is detected between the first label 790 and the second label 792, determines that the label comparison iteration 706 has ended successfully, as described with reference to FIG. 8, and, at 1118, determines whether the second labels 782 include at least one label to initiate a next label comparison iteration.

Alternatively, at 1122, the inter-layer conflict analyzer 228, in response to determining that the first label 790 conflicts with the second label 792, determines an intersection between the first label 790 and the second label 792. For example, the inter-layer conflict analyzer 228, in response to determining that the conflict detector 712 detected a conflict between the first label 790 and the second label 792, provides bounding boxes of the first label 790 and the second label 792 to the deconflictor 714, as described with reference to FIG. 8. The deconflictor 714 determines the intersection 140 between the first label 790 and the second label 792, as described with reference to FIG. 8.

At 1124, the inter-layer conflict analyzer 228 moves the first label 790, the second label 792, or both. For example, the deconflictor 714 generates candidate label locations of the first label 790 and the second label 792 based on the intersection 140, as described with reference to FIG. 8. The selection criterion analyzer 716 determines whether each of the candidate label locations satisfies a corresponding selection criterion, as described with reference to FIG. 8. The inter-layer conflict analyzer 228 updates the layer bounding box data 223 to designate a candidate label location as a label location based at least in part on the candidate label location satisfying the selection criterion, as described with reference to FIG. 8. At 1116, the inter-layer conflict analyzer 228, responsive to moving the first label 790, resets the second labels 782 to include the labels 313B of the layer 221B, as described with reference to FIG. 8.

Figure 12:
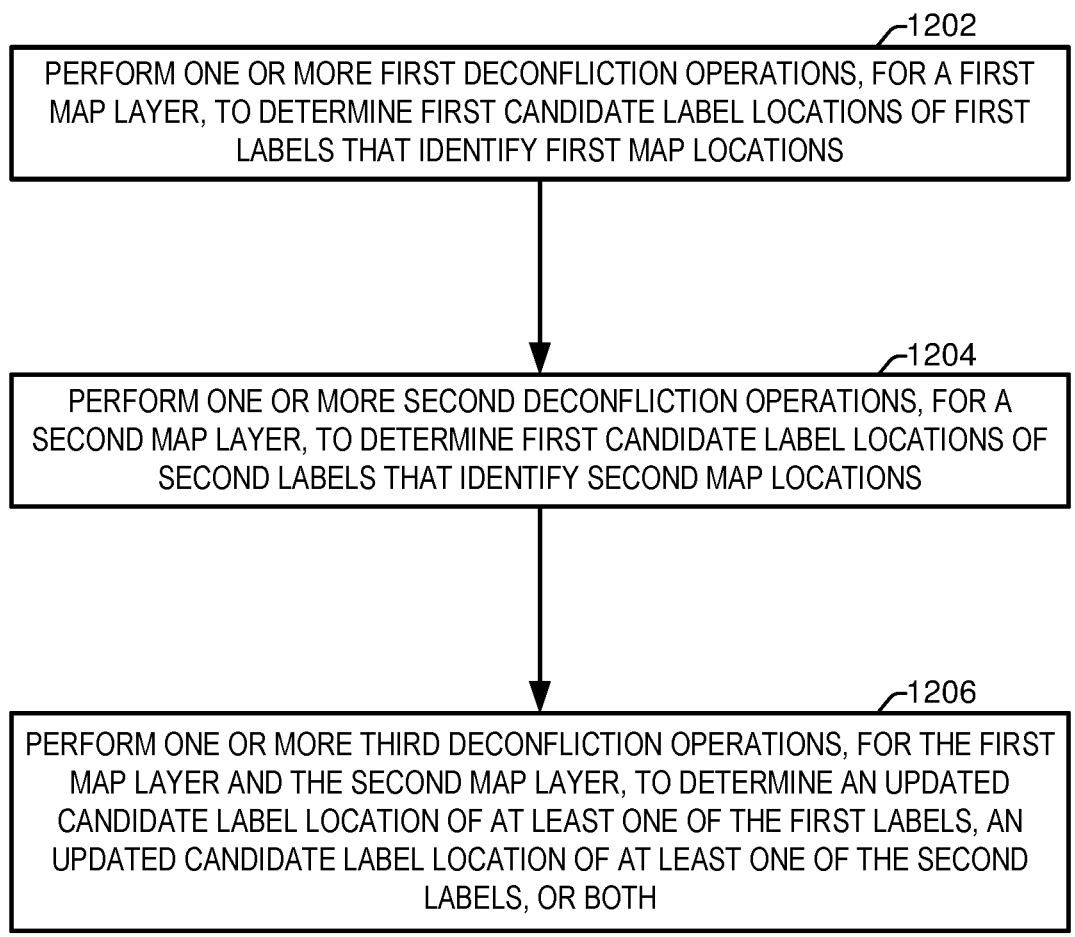
FIG. 12 is a diagram that illustrates a flow chart of an example of a method of adjusting locations of labels of a map with multiple layers.

Referring to FIG. 12, an example is shown of a method 1200 of an example of adjusting locations of labels of a map with multiple layers. In a particular aspect, one or more operations of the method 1200 are performed by the map generator 104 of FIG. 1, the layer bounding box generator 222, the intra-layer conflict analyzer 226, the inter-layer conflict analyzer 228, the one or more processors 290, the device 202, the system 200 of FIG. 2, the label selector 312, the label location generator 314, the bounding box generator 316 of FIG. 3, or a combination thereof.

The method 1200 includes, at 1202, performing one or more first deconfliction operations for a first map layer to determine first candidate label locations of first labels that identify first map locations. For example, the intra-layer conflict analyzer 226 of FIG. 2 performs the intra-layer deconfliction operations 233A for the layer 221A to determine the layer bounding box data 223A, as described with reference to FIGS. 2 and 7A-7D. The layer bounding box data 223A indicates label locations 122 of the labels 313A that identify map locations 128. In some aspects, the label location 122A indicated by the layer bounding box data 223A corresponds to the candidate label location 126A determined by the intra-layer conflict analyzer 226, as described with reference to FIG. 7A.

The method 1200 also includes, at 1204, performing one or more second deconfliction operations for a second map layer to determine first candidate label locations of second labels that identify second map locations. For example, the intra-layer conflict analyzer 226 of FIG. 2 performs the intra-layer deconfliction operations 233B for the layer 221B to determine the layer bounding box data 223B, as described with reference to FIGS. 2 and 7A-7D. The layer bounding box data 223B indicates label locations 122 of the labels 313B that identify map locations 128. In some aspects, the label location 122B indicated by the layer bounding box data 223B corresponds to the candidate label location 126B determined by the intra-layer conflict analyzer 226, as described with reference to FIG. 7A.

The method 1200 further includes, at 1206, performing one or more third deconfliction operations, for the first map layer and the second map layer, to determine an updated candidate label location of at least one of the first labels, an updated candidate label location of at least one of the second labels, or both. For example, the inter-layer conflict analyzer 228 of FIG. 2 performs the inter-layer deconfliction operations 235, for the layer 221A and the layer 221B, to update the layer bounding box data 223A, the layer bounding box data 223B, or both, as described with reference to FIGS. 2 and 8. In some aspects, the label location 122A indicated by the layer bounding box data 223A corresponds to the candidate label location 126A determined by the inter-layer conflict analyzer 228, as described with reference to FIG. 8. In some aspects, the label location 122B indicated by the layer bounding box data 223B corresponds to the candidate label location 126B determined by the inter-layer conflict analyzer 228, as described with reference to FIG. 8.

A technical advantage of the method 1200 can include that the label 112A at the candidate label location 126A and the label 112B at the candidate label location 126C is easier to read than the label 112A at the label location 122A and the label 112B at the label location 122B.

Figure 13:
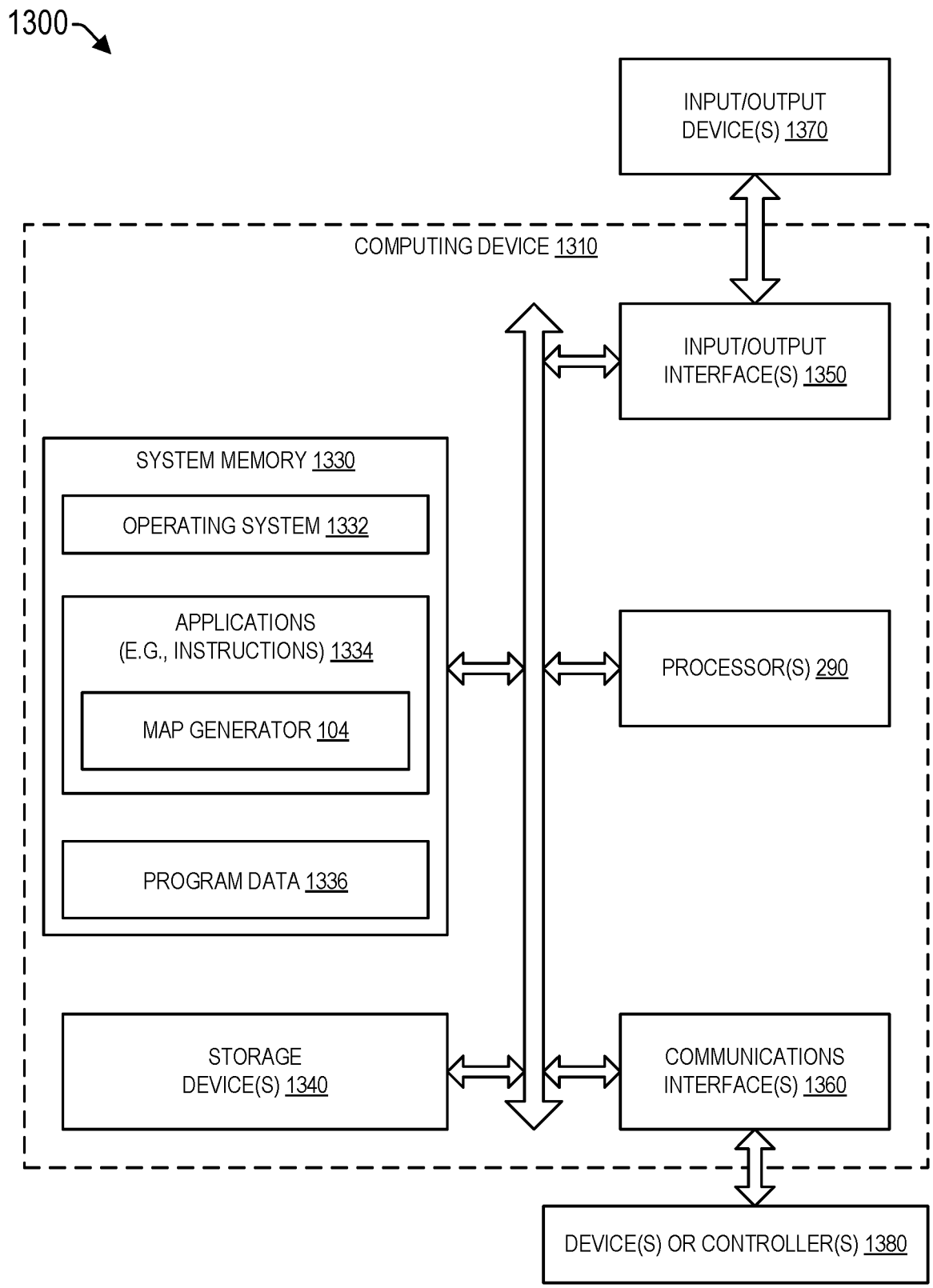
FIG. 13 is a block diagram of a computing environment including a computing device configured to support aspects of computer-implemented methods and computer-executable program instructions (or code) according to the present disclosure.

FIG. 13 is a block diagram of a computing environment 1300 including a computing device 1310 configured to support aspects of computer-implemented methods and computer-executable program instructions (or code) according to the present disclosure. For example, the computing device 1310, or portions thereof, is configured to execute instructions to initiate, perform, or control one or more operations described with reference to FIGS. 1-12.

The computing device 1310 includes the one or more processors 290. The one or more processors 290 are configured to communicate with system memory 1330, one or more storage devices 1340, one or more input/output interfaces 1350, one or more communications interfaces 1360, or any combination thereof. The system memory 1330 includes volatile memory devices (e.g., random access memory (RAM) devices), nonvolatile memory devices (e.g., read-only memory (ROM) devices, programmable read-only memory, and flash memory), or both. The system memory 1330 stores an operating system 1332, which may include a basic input/output system for booting the computing device 1310 as well as a full operating system to enable the computing device 1310 to interact with users, other programs, and other devices. The system memory 1330 stores system (program) data 1336, such as data used or generated by the map generator 104.

The system memory 1330 includes one or more applications 1334 (e.g., sets of instructions) executable by the one or more processors 290. As an example, the one or more applications 1334 include the instructions 294 executable by the one or more processors 290 to initiate, control, or perform one or more operations described with reference to FIGS. 1-12. To illustrate, the one or more applications 1334 include the instructions 294 executable by the one or more processors 290 to initiate, control, or perform one or more operations described with reference to the map generator 104.

In a particular implementation, the system memory 1330 includes a non-transitory, computer readable medium storing the instructions 294 that, when executed by the one or more processors 290, cause the one or more processors 290 to perform one or more first deconfliction operations (e.g., the intra-layer deconfliction operations 233A), for a first map layer (e.g., the layer 221A), to determine first candidate label locations (e.g., the candidate label location 126A) of first labels (e.g., the label 112A) that identify first map locations (e.g., the map location 128A). The instructions 294, when executed by the one or more processors 290, also cause the one or more processors 290 to perform one or more second deconfliction operations (e.g., the intra-layer deconfliction operations 233B), for a second map layer (e.g., the layer 221B), to determine first candidate label locations (e.g., the candidate label location 126B) of second labels (e.g., the label 112B) that identify second map locations (e.g., the map location 128B). The instructions 294, when executed by the one or more processors 290, further cause the one or more processors 290 to perform one or more third deconfliction operations (e.g., the inter-layer deconfliction operations 235), for the first map layer and the second map layer, to determine an updated candidate label location (e.g., the candidate label location 126A) of at least one of the first labels, an updated candidate label location (e.g., the candidate label location 126B) of at least one of the second labels, or both.

The one or more storage devices 1340 include nonvolatile storage devices, such as magnetic disks, optical disks, or flash memory devices. In a particular example, the storage devices 1340 include both removable and non-removable memory devices. The storage devices 1340 are configured to store an operating system, images of operating systems, applications (e.g., one or more of the applications 1334), and program data (e.g., the program data 1336). In a particular aspect, the system memory 1330, the storage devices 1340, or both, include tangible computer-readable media. In a particular aspect, one or more of the storage devices 1340 are external to the computing device 1310.

The one or more input/output interfaces 1350 enable the computing device 1310 to communicate with one or more input/output devices 1370 to facilitate user interaction. For example, the one or more input/output interfaces 1350 can include a display interface, an input interface, or both. For example, the input/output interface 1350 is adapted to receive input from a user, to receive input from another computing device, or a combination thereof. In some implementations, the input/output interface 1350 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1370 includes one or more user interface devices and displays, including some combination of buttons, keyboards, pointing devices, displays, speakers, microphones, touch screens, and other devices.

The one or more processors 290 are configured to communicate with devices or controllers 1380 via the one or more communications interfaces 1360. For example, the one or more communications interfaces 1360 can include a network interface. The devices or controllers 1380 can include, for example, a user device, a display device, one or more other devices, or any combination thereof.

In conjunction with the described systems and methods, an apparatus for adjusting locations of labels of a map with multiple layers is disclosed that includes means for performing one or more first deconfliction operations, for a first map layer, to determine first candidate label locations of first labels that identify first map locations. In some implementations, the means for performing the one or more first deconfliction operations corresponds to the map generator 104 of FIG. 1, the intra-layer conflict analyzer 226, the one or more processors 290, the device 202, the system 200 of FIG. 2, the computing device 1310, one or more other circuits or devices configured to perform the one or more first deconfliction operations, or a combination thereof.

The apparatus also includes means for performing one or more second deconfliction operations, for a second map layer, to determine second candidate label locations of second labels that identify second map locations. In some implementations, the means for performing the one or more second deconfliction operations corresponds to the map generator 104 of FIG. 1, the intra-layer conflict analyzer 226, the one or more processors 290, the device 202, the system 200 of FIG. 2, the computing device 1310, one or more other circuits or devices configured to perform the one or more second deconfliction operations, or a combination thereof.

The apparatus further includes means for performing one or more third deconfliction operations, for the first map layer and the second map layer, to determine an updated first candidate label location of at least one of the first labels, an updated second candidate label location of at least one of the second labels, or both. In some implementations, the means for performing the one or more third deconfliction operations corresponds to the map generator 104 of FIG. 1, the inter-layer conflict analyzer 228, the one or more processors 290, the device 202, the system 200 of FIG. 2, the computing device 1310, one or more other circuits or devices configured to perform the one or more third deconfliction operations, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-12. In some implementations, part or all of one or more of the operations or methods of FIGS. 1-12 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a device includes: one or more processors configured to: perform one or more first deconfliction operations, for a first map layer, to determine first candidate label locations of first labels that identify first map locations; perform one or more second deconfliction operations, for a second map layer, to determine first candidate label locations of second labels that identify second map locations; and perform one or more third deconfliction operations, for the first map layer and the second map layer, to determine an updated candidate label location of at least one of the first labels, an updated candidate label location of at least one of the second labels, or both.

Example 2 includes the device of Example 1, wherein the one or more processors are configured to: determine that a region of a map is associated with a plurality of labels; and select, based on a selection criterion, a set of labels from the plurality of labels to include in the map, wherein the set of labels includes at least the first labels and the second labels.

Example 3 includes the device of Example 2, wherein the selection criterion is based on a zoom level of the map, a list of label types associated with the map, or both.

Example 4 includes the device of Example 2 or Example 3, wherein the selection criterion is based on default data, a configuration setting, a user input, or a combination thereof.

Example 5 includes the device of any of Example 1 to Example 4, wherein the one or more processors are configured to: determine first label locations of the first labels; determine, based on the first label locations of the first labels, first bounding boxes of the first labels; perform the one or more first deconfliction operations based on the first bounding boxes; determine first label locations of the second labels; determine, based on the first label locations of the second labels, first bounding boxes of the second labels; and perform the one or more second deconfliction operations based on the first bounding boxes of the second labels.

Example 6 includes the device of Example 5, wherein the one or more processors are configured to, based on a distance offset, a direction offset, or both, from a first symbol of a first map location, determine a first label location of a first label that identifies the first map location, wherein the first label locations of the first labels include the first label location of the first label.

Example 7 includes the device of Example 5 or Example 6, wherein the one or more processors are configured to, based on a font type, a font size, a text alignment, a text size, a text buffer, a text filter, or a combination thereof, of a first label, determine a first bounding box of the first label, wherein the first bounding boxes of the first labels include the first bounding box of the first label.

Example 8 includes the device of any of Example 1 to Example 7, wherein the one or more processors are configured to: determine, based on the first candidate label locations of the first labels, first candidate bounding boxes of the first labels; determine, based on the first candidate label locations of the second labels, first candidate bounding boxes of the second labels; and perform the one or more third deconfliction operations based on the first candidate bounding boxes of the first labels and the first candidate bounding boxes of the second labels.

Example 9 includes the device of any of Example 1 to Example 8, wherein the one or more processors are configured to perform the one or more third deconfliction operations including, based on determining that a first candidate bounding box of a first label overlaps a first candidate bounding box of a second label, determine a second candidate label location of the first label and a second candidate label location of the second label based on an intersection of the first candidate bounding box of the first label and the first candidate bounding box of the second label, wherein the updated candidate label location of at least one of the first labels includes the second candidate label location of the first label, and wherein the updated candidate label location of at least one of the second labels includes the second candidate label location of the second label.

Example 10 includes the device of Example 9, wherein the one or more processors are configured to: determine a movement offset based on dimensions of the intersection; determine the second candidate label location of the first label based on a first candidate label location of the first label and the movement offset, wherein the first candidate label locations of the first labels include the first candidate label location of the first label; and determine the second candidate label location of the second label based on a first candidate label location of the second label and the movement offset, wherein the first candidate label locations of the second labels include the first candidate label location of the second label.

Example 11 includes the device of Example 10, wherein the one or more processors are configured to apply a first portion of the movement offset to the first candidate label location of the first label to determine the second candidate label location of the first label.

Example 12 includes the device of Example 11, wherein the first portion is based at least in part on a first label type of the first label and a second label type of the second label.

Example 13 includes the device of Example 12, wherein the first label type includes one of a navigation aid (navaid) label type, a way point label type, a route label type, an airport label type, an airway label type, or an airspace label type, and the second label type includes another one of the navaid label type, the way point label type, the route label type, the airport label type, the airway label type, or the airspace label type.

Example 14 includes the device of any of Example 9 to Example 13, wherein the one or more processors are configured to: determine, based on the second candidate label location, a second candidate bounding box of the first label; and based on determining that the second candidate bounding box is within a threshold distance of a first map location indicated by the first label, determine that the second candidate label location satisfies a first selection criterion.

Example 15 includes the device of any of Example 1 to Example 14, wherein the one or more processors are configured to, subsequent to performing the one or more third deconfliction operations and based on determining that label locations of the first labels satisfy a first selection criterion and that label locations of the second labels satisfy a second selection criterion, generate a map including the first labels at the label locations of the first labels and the second labels at the label locations of the second labels.

Example 16 includes the device of any of Example 1 to Example 15, wherein the one or more processors are configured to, subsequent to performing the one or more third deconfliction operations and based on determining that a label location of a first label fails to satisfy a first selection criterion: generate a graphical user interface (GUI) indicating the label location of the first label; based on receiving a user input, determine an updated label location of the first label; and generate a map indicating the first labels at label locations of the first labels and the second labels at label locations of the second labels, wherein the label locations of the first labels include the updated label location of the first label.

Example 17 includes the device of any of Example 1 to Example 16, wherein the one or more processors are further configured to: generate a map including the at least one of the first labels at the updated first candidate label location, the at least one of the second labels at the updated second candidate label location, or both; and provide the map to a display device.

According to Example 18, a method includes: performing one or more first deconfliction operations, for a first map layer, to determine first candidate label locations of first labels that identify first map locations; performing one or more second deconfliction operations, for a second map layer, to determine second candidate label locations of second labels that identify second map locations; and performing one or more third deconfliction operations, for the first map layer and the second map layer, to determine an updated first candidate label location of at least one of the first labels, an updated second candidate label location of at least one of the second labels, or both.

Example 19 includes the method of Example 18, further including: determining that a region of a map is associated with a plurality of labels; and selecting, based on a selection criterion, a set of labels from the plurality of labels to include in the map, wherein the set of labels includes at least the first labels and the second labels.

Example 20 includes the method of Example 19, wherein the selection criterion is based on a zoom level of the map, a list of label types associated with the map, or both.

Example 21 includes the method of Example 19 or Example 20, wherein the selection criterion is based on default data, a configuration setting, a user input, or a combination thereof.

Example 22 includes the method of any of Example 18 to Example 21, further including: determining first label locations of the first labels; determining, based on the first label locations of the first labels, first bounding boxes of the first labels; performing the one or more first deconfliction operations based on the first bounding boxes; determining first label locations of the second labels; determining, based on the first label locations of the second labels, first bounding boxes of the second labels; and performing the one or more second deconfliction operations based on the first bounding boxes of the second labels.

Example 23 includes the method of Example 22, further including determining a first label location of a first label that identifies a first map location, the first label location of the first label based on a distance offset, a direction offset, or both, from a first symbol of the first map location, wherein the first label locations of the first labels include the first label location of the first label.

Example 24 includes the method of Example 22 or Example 23, further including determining a first bounding box of a first label, the first bounding box based on a font type, a font size, a text alignment, a text size, a text buffer, a text filter, or a combination thereof, of the first label, wherein the first bounding boxes of the first labels include the first bounding box of the first label.

Example 25 includes the method of any of Example 18 to Example 24, further including: determining, based on the first candidate label locations of the first labels, first candidate bounding boxes of the first labels; determining, based on the first candidate label locations of the second labels, first candidate bounding boxes of the second labels; and performing the one or more third deconfliction operations based on the first candidate bounding boxes of the first labels and the first candidate bounding boxes of the second labels.

Example 26 includes the method of any of Example 18 to Example 25, further including performing the one or more third deconfliction operations including, based on determining that a first candidate bounding box of a first label overlaps a first candidate bounding box of a second label, determining a second candidate label location of the first label and a second candidate label location of the second label based on an intersection of the first candidate bounding box of the first label and the first candidate bounding box of the second label, wherein the updated candidate label location of at least one of the first labels includes the second candidate label location of the first label, and wherein the updated candidate label location of at least one of the second labels includes the second candidate label location of the second label.

Example 27 includes the method of Example 26, further including: determining a movement offset based on dimensions of the intersection; determining the second candidate label location of the first label based on a first candidate label location of the first label and the movement offset, wherein the first candidate label locations of the first labels include the first candidate label location of the first label; and determining the second candidate label location of the second label based on a first candidate label location of the second label and the movement offset, wherein the first candidate label locations of the second labels include the first candidate label location of the second label.

Example 28 includes the method of Example 27, further including applying a first portion of the movement offset to the first candidate label location of the first label to determine the second candidate label location of the first label.

Example 29 includes the method of Example 28, wherein the first portion is based at least in part on a first label type of the first label and a second label type of the second label.

Example 30 includes the method of Example 29, wherein the first label type includes one of a navigation aid (navaid) label type, a way point label type, a route label type, an airport label type, an airway label type, or an airspace label type, and the second label type includes another one of the navaid label type, the way point label type, the route label type, the airport label type, the airway label type, or the airspace label type.

Example 31 includes the method of any of Example 26 to Example 30, further including: determining, based on the second candidate label location, a second candidate bounding box of the first label; and based on determining that the second candidate bounding box is within a threshold distance of a first map location indicated by the first label, determining that the second candidate label location satisfies a first selection criterion.

Example 32 includes the method of any of Example 18 to Example 31, further including, subsequent to performing the one or more third deconfliction operations and based on determining that label locations of the first labels satisfy a first selection criterion and that label locations of the second labels satisfy a second selection criterion, generating a map including the first labels at the label locations of the first labels and the second labels at the label locations of the second labels.

Example 33 includes the method of any of Example 18 to Example 32, further including, subsequent to performing the one or more third deconfliction operations and based on determining that a label location of a first label fails to satisfy a first selection criterion: generating a graphical user interface (GUI) indicating the label location of the first label; based on receiving a user input, determining an updated label location of the first label; and generating a map indicating the first labels at label locations of the first labels and the second labels at label locations of the second labels, wherein the label locations of the first labels include the updated label location of the first label.

Example 34 includes the method of any of Example 18 to Example 33, further including: generating a map including the at least one of the first labels at the updated first candidate label location, the at least one of the second labels at the updated second candidate label location, or both; and providing the map to a display device.

According to Example 35, a device includes: a memory configured to store instructions; and a processor configured to execute the instructions to perform the method of any of Example 18 to 34.

According to Example 36, a non-transitory computer-readable medium stores instructions that, when executed by a processor, cause the processor to perform the method of any of Example 18 to Example 34.

According to Example 37, an apparatus includes means for carrying out the method of any of Example 18 to Example 34.

According to Example 38, a non-transitory computer-readable medium stores instructions that, when executed by one or more processors, cause the one or more processors to: perform one or more first deconfliction operations, for a first map layer, to determine first candidate label locations of first labels that identify first map locations; perform one or more second deconfliction operations, for a second map layer, to determine first candidate label locations of second labels that identify second map locations; and perform one or more third deconfliction operations, for the first map layer and the second map layer, to determine an updated candidate label location of at least one of the first labels, an updated candidate label location of at least one of the second labels, or both.

Example 39 includes the non-transitory computer-readable medium of Example 38, wherein the instructions, when executed by the one or more processors, also cause the one or more processors to: determine first label locations of the first labels; determine, based on the first label locations of the first labels, first bounding boxes of the first labels; perform the one or more first deconfliction operations based on the first bounding boxes; determine first label locations of the second labels; determine, based on the first label locations of the second labels, first bounding boxes of the second labels; and perform the one or more second deconfliction operations based on the first bounding boxes of the second labels.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
one or more processors configured to:
    perform one or more first deconfliction operations, for a first map layer, to determine first candidate label locations of first labels that identify first map locations;
    perform one or more second deconfliction operations, for a second map layer, to determine first candidate label locations of second labels that identify second map locations; and
    perform one or more third deconfliction operations, for the first map layer and the second map layer, to determine an updated candidate label location of a first label of the first labels, an updated candidate label location of a second label of the second labels, or both,
    wherein, to determine the updated candidate label location of the first label, the updated candidate label location of the second label, or both, the one or more processors are configured to perform a movement offset operation on a first candidate label location of the first label, a first candidate label location of the second label, or both so that a second candidate bounding box of the first label and a second candidate bounding box of the second label do not overlap when the first label and the second label are simultaneously displayed,
    wherein a particular movement offset of the movement offset operation is determined based on dimensions of an intersection of a first candidate bounding box of the first label and a first candidate bounding box of the second label, wherein the first candidate label locations of the first labels include the first candidate label location of the first label, and wherein the first candidate label locations of the second labels include the first candidate label location of the second label.

2. The device of claim 1, wherein the one or more processors are configured to:

determine that a region of a map is associated with a plurality of labels; and select, based on a selection criterion, a set of labels from the plurality of labels to include in the map, wherein the set of labels includes at least the first labels and the second labels.

3. The device of claim 2, wherein the selection criterion is based on a zoom level of the map, a list of label types associated with the map, or both.

4. The device of claim 2, wherein the selection criterion is based on default data, a configuration setting, a user input, or a combination thereof.

5. The device of claim 1, wherein the one or more processors are configured to:

determine first label locations of the first labels;

determine, based on the first label locations of the first labels, first bounding boxes of the first labels;

perform the one or more first deconfliction operations based on the first bounding boxes;

determine first label locations of the second labels;

determine, based on the first label locations of the second labels, first bounding boxes of the second labels; and perform the one or more second deconfliction operations based on the first bounding boxes of the second labels.

6. The device of claim 5, wherein the one or more processors are configured to, based on a distance offset, a direction offset, or both, from a first symbol of a first map location, determine a first label location of the first label that identifies the first map location, wherein the first label locations of the first labels include the first label location of the first label.

7. The device of claim 5, wherein the one or more processors are configured to, based on a font type, a font size, a text alignment, a text size, a text buffer, a text filter, or a combination thereof, of a first label, determine a first bounding box of the first label, wherein the first bounding boxes of the first labels include the first bounding box of the first label.

8. The device of claim 1, wherein the one or more processors are configured to:

determine, based on the first candidate label locations of the first labels, first candidate bounding boxes of the first labels;

determine, based on the first candidate label locations of the second labels, first candidate bounding boxes of the second labels; and perform the one or more third deconfliction operations based on the first candidate bounding boxes of the first labels and the first candidate bounding boxes of the second labels.

9. The device of claim 1, wherein the first candidate label location of the first label and the first candidate label location of the second label define an intersection region with a first corner and a second corner, and wherein the one or more processors are configured to determine a movement offset based on a difference between a first coordinate of the first corner and a second coordinate of the second corner.

10. The device of claim 1, wherein the one or more processors are configured to:

determine a movement offset based on dimensions of an intersection region;

determine the updated candidate label location of the first label based on the first candidate label location of the first label and the movement offset; and determine the updated candidate label location of the second label based on the first candidate label location of the second label and the movement offset.

11. The device of claim 10, wherein the one or more processors are configured to apply a first portion of the movement offset to the first candidate label location of the first label to determine the updated candidate label location of the first label.

12. The device of claim 11, wherein the first portion is based at least in part on a first label type of the first label and a second label type of the second label.

13. The device of claim 12, wherein the first label type includes one of a navigation aid (navaid) label type, a way point label type, a route label type, an airport label type, an airway label type, or an airspace label type, and the second label type includes another one of the navaid label type, the way point label type, the route label type, the airport label type, the airway label type, or the airspace label type.

14. The device of claim 10, wherein the one or more processors are configured to:

determine, based on the updated candidate label location of the first label, the second candidate bounding box of the first label; and based on determining that the second candidate bounding box is within a threshold distance of a first map location indicated by the first label, determine that the updated candidate label location of the first label satisfies a first selection criterion.

15. The device of claim 1, wherein the one or more processors are configured to, subsequent to performing the one or more third deconfliction operations and based on determining that label locations of the first labels satisfy a first selection criterion and that label locations of the second labels satisfy a second selection criterion, generate a map including the first labels at the label locations of the first labels and the second labels at the label locations of the second labels.

16. The device of claim 1, wherein the one or more processors are configured to, subsequent to performing the one or more third deconfliction operations and based on determining that a label location of the first label fails to satisfy a first selection criterion:

generate a graphical user interface (GUI) indicating the label location of the first label;

based on receiving a user input, determine an updated label location of the first label; and generate a map indicating the first labels at label locations of the first labels and the second labels at label locations of the second labels, wherein the label locations of the first labels include the updated label location of the first label.

17. A method comprising:

performing one or more first deconfliction operations, for a first map layer, to determine first candidate label locations of first labels that identify first map locations;

performing one or more second deconfliction operations, for a second map layer, to determine second candidate label locations of second labels that identify second map locations; and performing one or more third deconfliction operations, for the first map layer and the second map layer, to determine an updated candidate label location of a first label of the first labels, an updated candidate label location of a second label of the second labels, or both,
wherein determining the updated candidate label location of the first label, the updated candidate label location of the second label, or both, comprises performing a movement offset operation on a first candidate label location of the first label, a first candidate label location of the second label, or both so that a second candidate bounding box of the first label and a second candidate bounding box of the second label do not overlap when the first label and the second label are simultaneously displayed,
wherein a particular movement offset of the movement offset operation is determined based on dimensions of an intersection of a first candidate bounding box of the first label and a first candidate bounding box of the second label,
wherein the first candidate label locations of the first labels include the first candidate label location of the first label, and
wherein the first candidate label locations of the second labels include the first candidate label location of the second label.

18. The method of claim 17, further comprising:
generating a map including the first label at the updated candidate label location of the first label, the second label at the updated candidate label location of the second label, or both; and
providing the map to a display device.

19. A non-transitory computer-readable medium storing instructions that, when executed by one or more processors, cause the one or more processors to:
perform one or more first deconfliction operations, for a first map layer, to determine first candidate label locations of first labels that identify first map locations;
perform one or more second deconfliction operations, for a second map layer, to determine first candidate label locations of second labels that identify second map locations; and
perform one or more third deconfliction operations, for the first map layer and the second map layer, to determine an updated candidate label location of a first label of the first labels, an updated candidate label location of a second label of the second labels, or both,
wherein to determine the updated candidate label location of the first label, the updated candidate label location of the second label, or both, the one or more processors perform a movement offset operation on a first candidate label location of the first label, a first candidate label location of the second label, or both so that a second candidate bounding box of the first label and a second candidate bounding box of the second label do not overlap when the first label and the second label are simultaneously displayed,
wherein a particular movement offset of the movement offset operation is determined based on dimensions of an intersection of a first candidate bounding box of the first label and a first candidate bounding box of the second label,
wherein the first candidate label locations of the first labels include the first candidate label location of the first label, and
wherein the first candidate label locations of the second labels include the first candidate label location of the second label.

20. The non-transitory computer-readable medium of claim 19, wherein the instructions, when executed by the one or more processors, also cause the one or more processors to:
determine first label locations of the first labels;
determine, based on the first label locations of the first labels, first bounding boxes of the first labels;
perform the one or more first deconfliction operations based on the first bounding boxes;
determine first label locations of the second labels;
determine, based on the first label locations of the second labels, first bounding boxes of the second labels; and
perform the one or more second deconfliction operations based on the first bounding boxes of the second labels.

* * * * *